(12) United States Patent
Bizoara et al.

(10) Patent No.: US 11,580,493 B2
(45) Date of Patent: Feb. 14, 2023

(54) APPARATUSES, COMPUTER-IMPLEMENTED METHODS, AND COMPUTER PROGRAM PRODUCTS FOR AUTOMATIC PRODUCT VERIFICATION AND SHELF PRODUCT GAP ANALYSIS

(71) Applicant: Hand Held Products, Inc., Fort Mill, SC (US)

(72) Inventors: Manjul Bizoara, Hyderabad (IN); Sri Teja Gadamsetti, Hyderabad (IN); David Wilz, Sewell, NJ (US); Taylor Smith, Charlotte, NC (US); Douglas Hinson, Monroe, NC (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 17/164,610

(22) Filed: Feb. 1, 2021

(65) Prior Publication Data

US 2021/0248547 A1 Aug. 12, 2021

Related U.S. Application Data

(60) Provisional application No. 62/972,911, filed on Feb. 11, 2020.

(51) Int. Cl.
*G06Q 10/08* (2012.01)
*G06N 20/00* (2019.01)
*G06Q 30/00* (2012.01)

(52) U.S. Cl.
CPC .......... *G06Q 10/087* (2013.01); *G06N 20/00* (2019.01); *G06Q 30/018* (2013.01)

(58) Field of Classification Search
CPC .... G06Q 10/087; G06Q 30/018; G06N 20/00; G06V 20/68; G06V 20/52
See application file for complete search history.

(56) References Cited

U.S. PATENT DOCUMENTS

| 5,382,779 A | 1/1995 | Gupta |
| 7,693,757 B2 | 4/2010 | Zimmerman |

(Continued)

FOREIGN PATENT DOCUMENTS

WO 2018/204342 A1 11/2018

OTHER PUBLICATIONS

Extended European Search Report issued in European Application No. 21156112.1 dated Jun. 23, 2021, 9 pages.

*Primary Examiner* — Nathan A Mitchell
*Assistant Examiner* — Kimberly S. Bursum
(74) *Attorney, Agent, or Firm* — Alston & Bird LLP

(57) ABSTRACT

Embodiments of the present disclosure include apparatuses, computer-implemented methods, and computer program products for automatic product verification and shelf product gap analysis. Some embodiments utilize a multi-imager imaging engine to capture at least two image data objects associated with at least a near field and a far field via corresponding near and far-field imagers. The far field image data object in some embodiments is processed to identify, and/or detect and decode, product information on a product label at a shelving location for future processing. The near-field image data object may be processed to identify a product set located within the environment surrounding the product label. The information identified from each image data object may be processed to identify whether one or more product mismatches, pricing mismatches, and/or product gaps are present at the shelving location, with improved likelihood of success for each task.

18 Claims, 11 Drawing Sheets

(56) References Cited

U.S. PATENT DOCUMENTS

| | | |
|---|---|---|
| 2015/0262116 A1 | 9/2015 | Katircioglu et al. |
| 2018/0107999 A1 | 4/2018 | Rizzolo et al. |
| 2020/0005225 A1 | 1/2020 | Chaubard |
| 2021/0398202 A1* | 12/2021 | Adato .................. G06K 9/6217 |

* cited by examiner

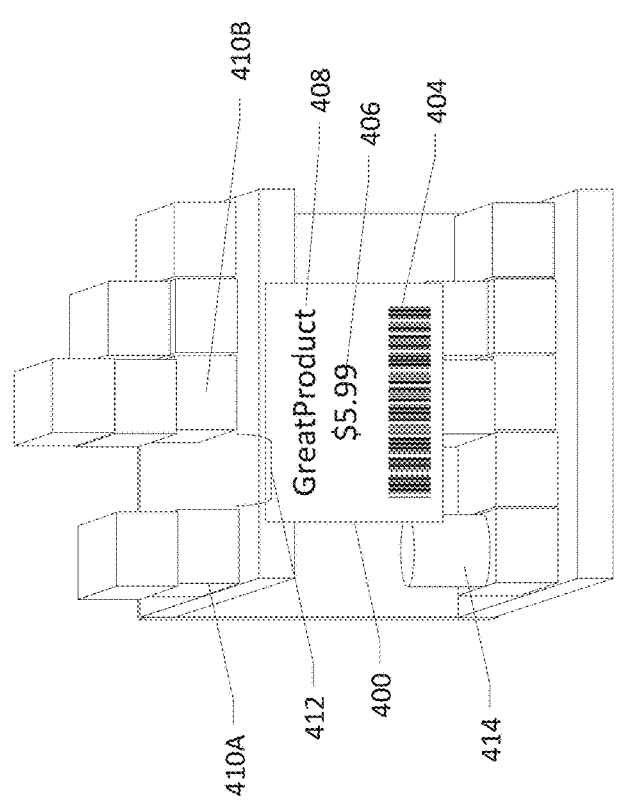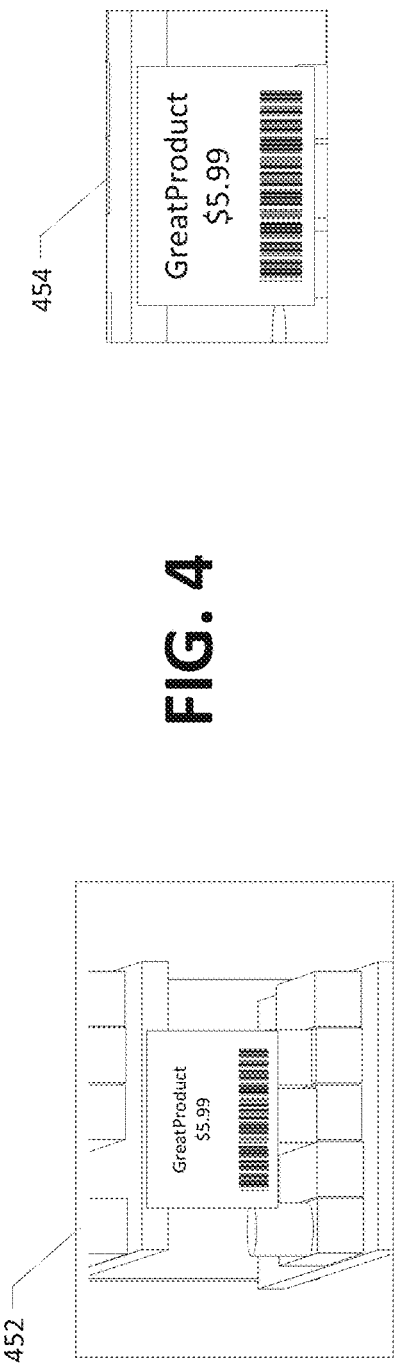
FIG. 4

APPARATUSES, COMPUTER-IMPLEMENTED METHODS, AND COMPUTER PROGRAM PRODUCTS FOR AUTOMATIC PRODUCT VERIFICATION AND SHELF PRODUCT GAP ANALYSIS

CROSS-REFERENCE TO RELATED APPLICATIONS

This application claims the benefit of U.S. Provisional Application No. 62/972,911, filed Feb. 11, 2020, the contents of which are incorporated by reference herein in their entirety.

TECHNOLOGICAL FIELD

Embodiments of the present disclosure generally relate to image processing implementations and methodologies, and specifically to image processing for automatic product verification and shelf product gap analysis utilizing an imaging apparatus including one or multiple imagers.

BACKGROUND

Personnel associated with a particular environment desire to know if a product is placed near the correct product label at a shelving location, and if the product label for the product includes correct product information such as a current product price, to be able to replace incorrect products at a shelving location and/or update a product label to reflect up-to-date product information. Additionally, retail store management desires to know if there are gaps between shelving products, which may indicate a sub-optimal use of shelving space and/or a waste of shelving space. Such processes for identifying misplaced products and/or analyzing shelf gaps is time consuming, human-resource intensive, and often is difficult to be performed efficiently and effectively by a human operator. Applicant has discovered problems with current implementations of product verification and shelf product gap analysis. Through applied effort, ingenuity, and innovation, Applicant has solved many of these identified problems by developing embodied in the present disclosure, which are described in detail below.

BRIEF SUMMARY

In general, embodiments of the present disclosure provided herein include apparatuses, computer program products, and computer-implemented methods for automatic product verification and shelf product gap analysis. Other implementations for one or more of the alternative illuminator assemblies and/or alternative illumination imaging apparatuses will be, or will become, apparent to one with skill in the art upon examination of the following figures and detailed description. It is intended that all such additional implementations be included within this description be within the scope of the disclosure, and be protected by the following claims.

In accordance with one aspect of the present disclosure, a computer-implemented method for automatic product verification and shelf product gap analysis is provided. The computer-implemented method may be performed via any of a myriad of computing hardware, software, and/or firmware as disclosed herein, for example via a specially configured multi-imager imaging apparatus. At least one example embodiment of the computer-implemented method includes capturing at least one far-field image data object using a far-field imager of a multi-imager imaging engine. The example computer-implemented method further includes identifying product label information associated with a product label represented within the at least one far-field image data object. The example computer-implemented method further includes capturing a near-field image data object using a near-field imager of a multi-imager imaging engine. The example computer-implemented method further includes identifying a product set represented within the near-field image data object. The example computer-implemented method further includes determining whether the product label information matches expected product label information associated with the product label. The example computer-implemented method further includes determining whether the product set includes at least one incorrect product based on the product label.

In some example embodiments of the computer-implemented method, identifying the product set represented within the near-field image data object comprises applying the near-field image data object to a trained product detection artificial intelligence algorithm or at least one trained product detection machine learning model.

In some example embodiments of the computer-implemented method, identifying the product label information associated with the product label comprises applying the far-field image data object to at least one trained OCR machine learning model, wherein the trained OCR machine learning model is configured to output at least a portion of the product label information.

In some example embodiments of the computer-implemented method, the example computer-implemented method further includes generating at least one alert selected from the group of a product mismatch alert, a price mismatch alert, and a product gap alert.

In some example embodiments of the computer-implemented method, the example computer-implemented method further includes causing storing of at least one image data object to at least one image datastore associated with training a product detection artificial intelligence algorithm or a trained product detection machine learning model.

In some example embodiments of the computer-implemented method, the example computer-implemented method further includes causing rendering of an interface to a display associated with the apparatus based on at least (1) the determination of whether the product label information matches the expected product label information associated with the product label, or (2) the determination of whether the product set includes at least one incorrect product based on the product label.

In some example embodiments of the computer-implemented method, determining whether the product label information matches the expected product label information associated with the product label comprises: retrieving the expected product label information based on at least product identification information from the product label information; comparing at least a portion of the product label information with the expected product label information to generate label comparison results data; and determining whether the product label information matches the expected product label information based on the label comparison results data.

In some example embodiments of the computer-implemented method, identifying the product label information associated with the product label comprises: detecting a visual indicia represented in the far-field image data object; and decoding the visual indicia to identify at least a portion of the product label information. Additionally or alternatively, in some such example embodiments of the computer-implemented method, the portion of the product label information comprises a first portion of the product label information, and the computer-implemented method further comprises retrieving, from at least one datastore, a second portion of the product label information based on at least product identification information in the first portion of the product label information.

In some example embodiments of the computer-implemented method, the example computer-implemented method further includes identifying at least one product gap between a first product of the product set and a second product of the product set. Additionally or alternatively, in some such example embodiments of the computer-implemented method, identifying at least one product gap between a first product of the product set and a second product of the product set comprises: identifying product dimension data for at least the first product of the product set; processing the near-field image data object to identify a defined empty space between the first product and the second product; and determining, based on the defined empty space and the product dimension data for at least the first product, the product gap between the first product and the second product.

In some example embodiments of the computer-implemented method, the example computer-implemented method further includes generating audio output based on determining the product label information does not match the expected product label information associated with the product label.

In some example embodiments of the computer-implemented method, the example computer-implemented method further includes generating audio output based on determining the product set includes at least one incorrect product based on the product label.

In accordance with yet another aspect of the present disclosure, an apparatus for automatic product verification and shelf product gap analysis is provided. In at least one example embodiment, the apparatus includes means for performing each step of any of the example computer-implemented methods described herein.

In another example embodiment, a second example apparatus includes a multi-imager imaging engine comprising at least a near-field imager and a far-field imager, the near-field imager associated with a near field of view that is wider than a far field of view associated with the far-field imager. The second example apparatus further includes at least one processor and at least one non-transitory memory. The at least one non-transitory memory has computer-coded instructions stored thereon, where the computer-coded instructions, in execution with the at least one processor, configure the apparatus to perform any of the example computer-implemented methods described herein.

In accordance with yet another aspect of the present disclosure, a computer program product for automatic product verification and shelf product gap analysis is provided. In at least one example embodiment, the example computer program product includes at least one non-transitory computer-readable storage medium having computer program code stored thereon. The computer program code, in execution with at least one processor, is configured for performing any of the example computer-implemented methods described herein.

BRIEF DESCRIPTION OF THE DRAWINGS

Figure 1:
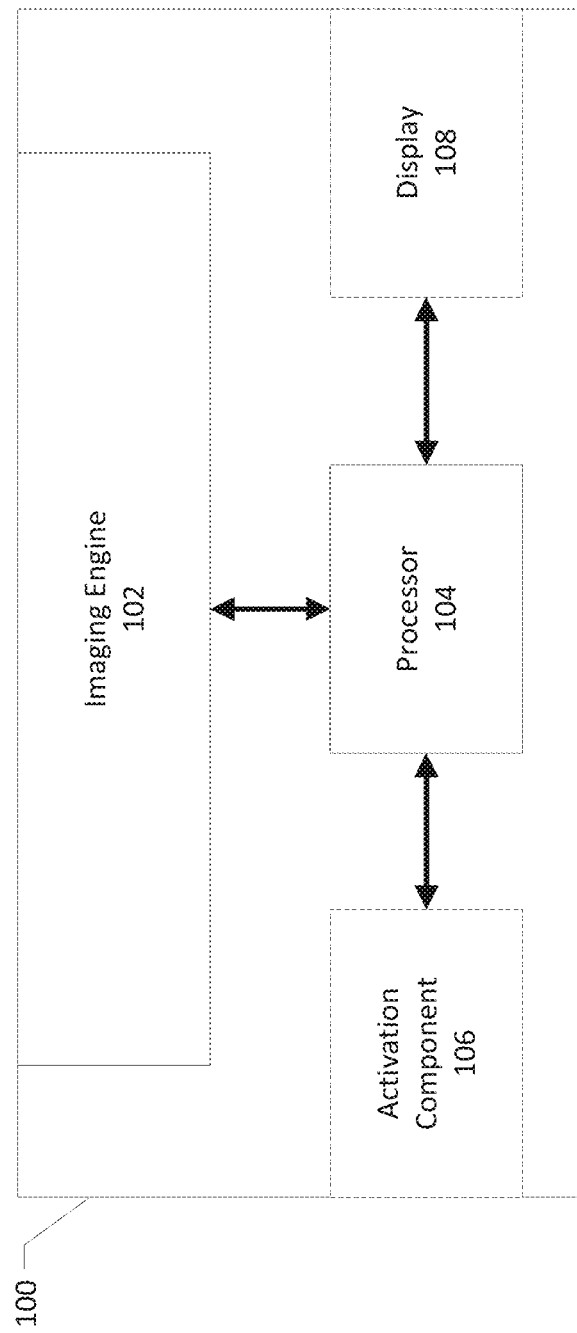
Figure 2:
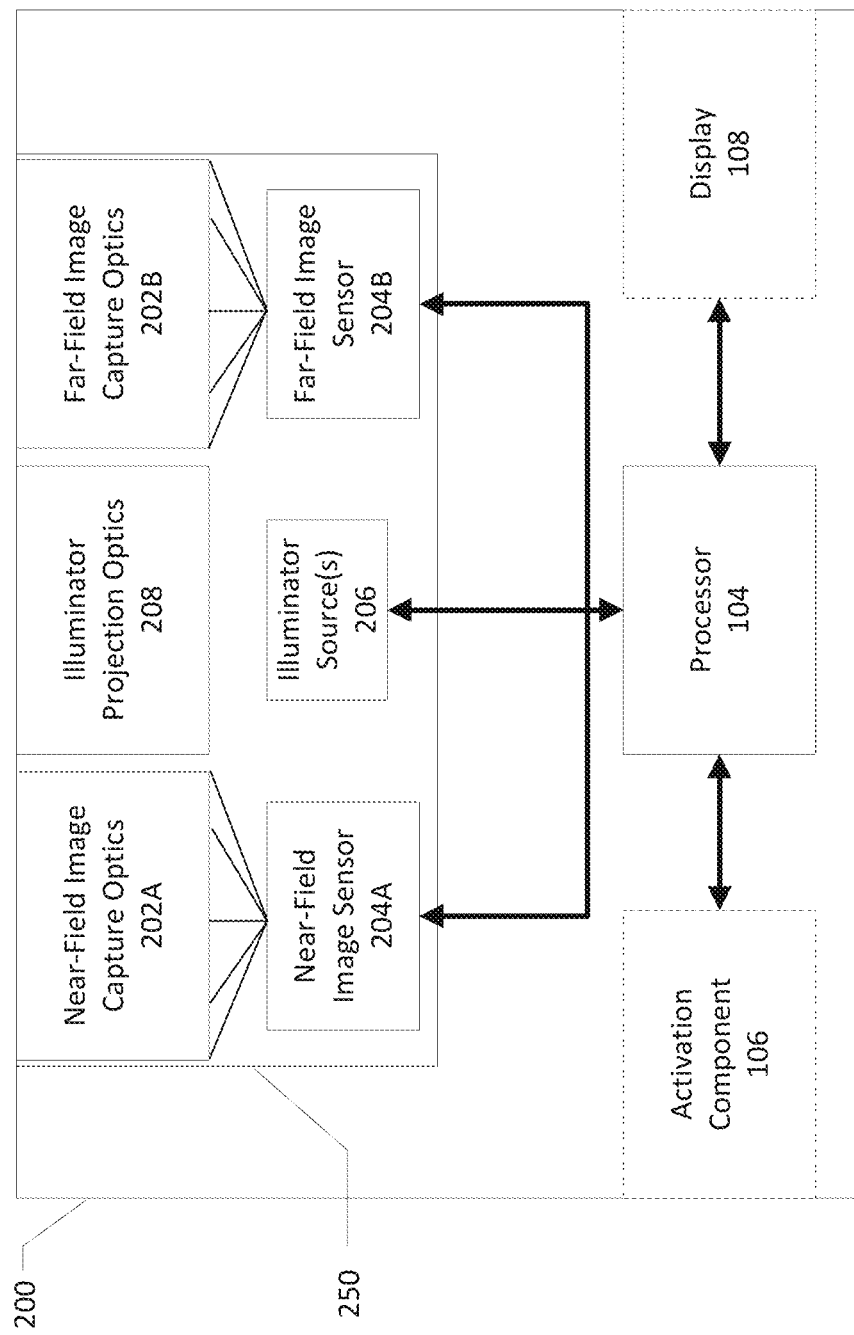
Figure 3:
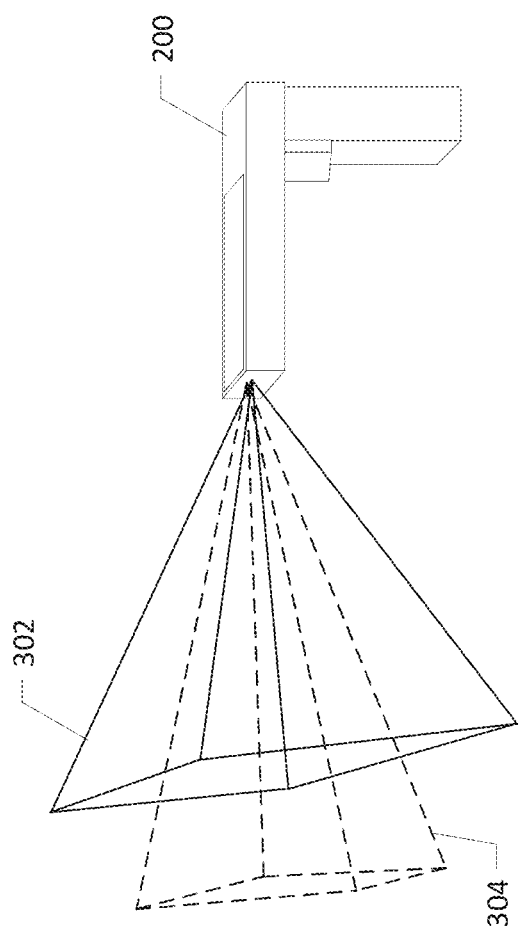
Figure 5:
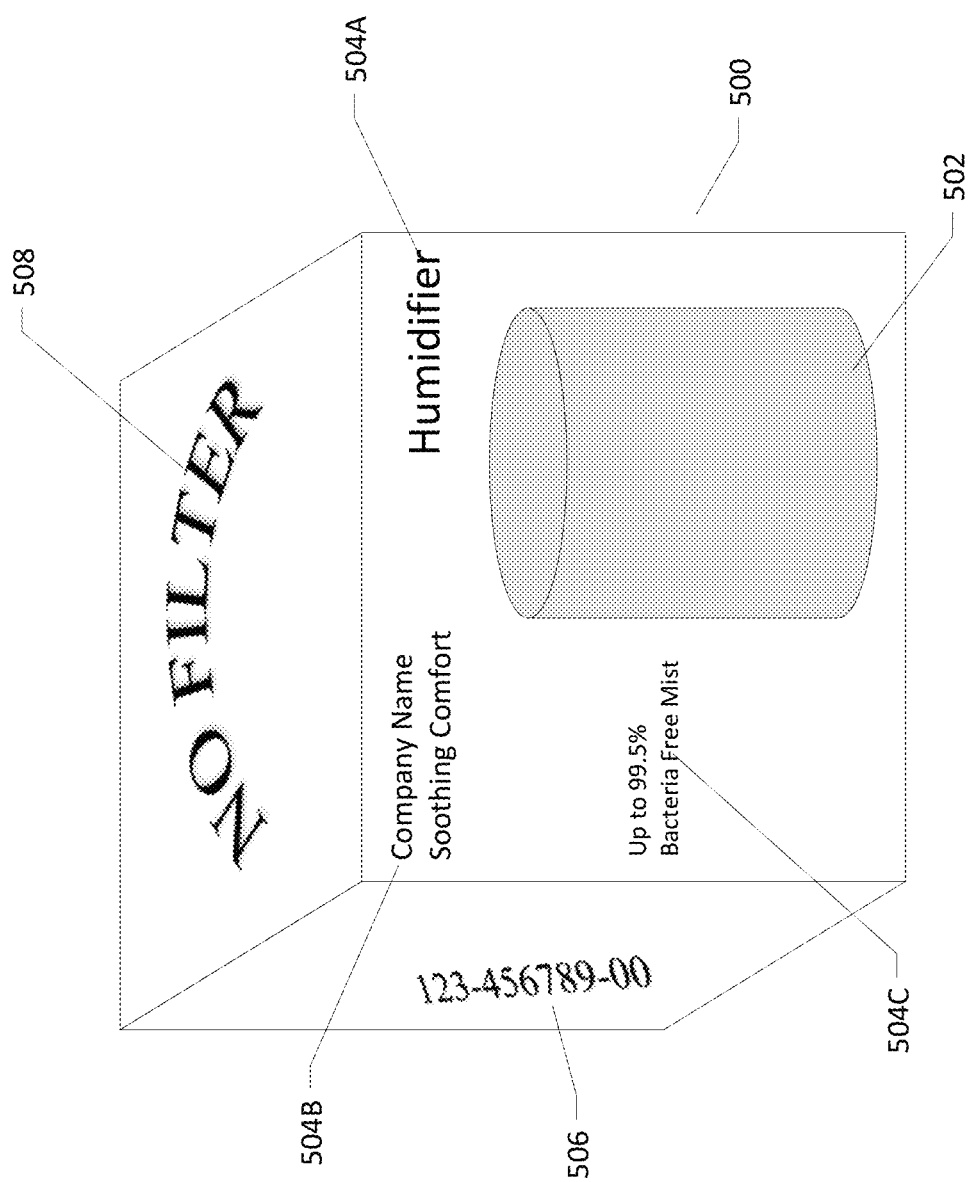
Figure 6:
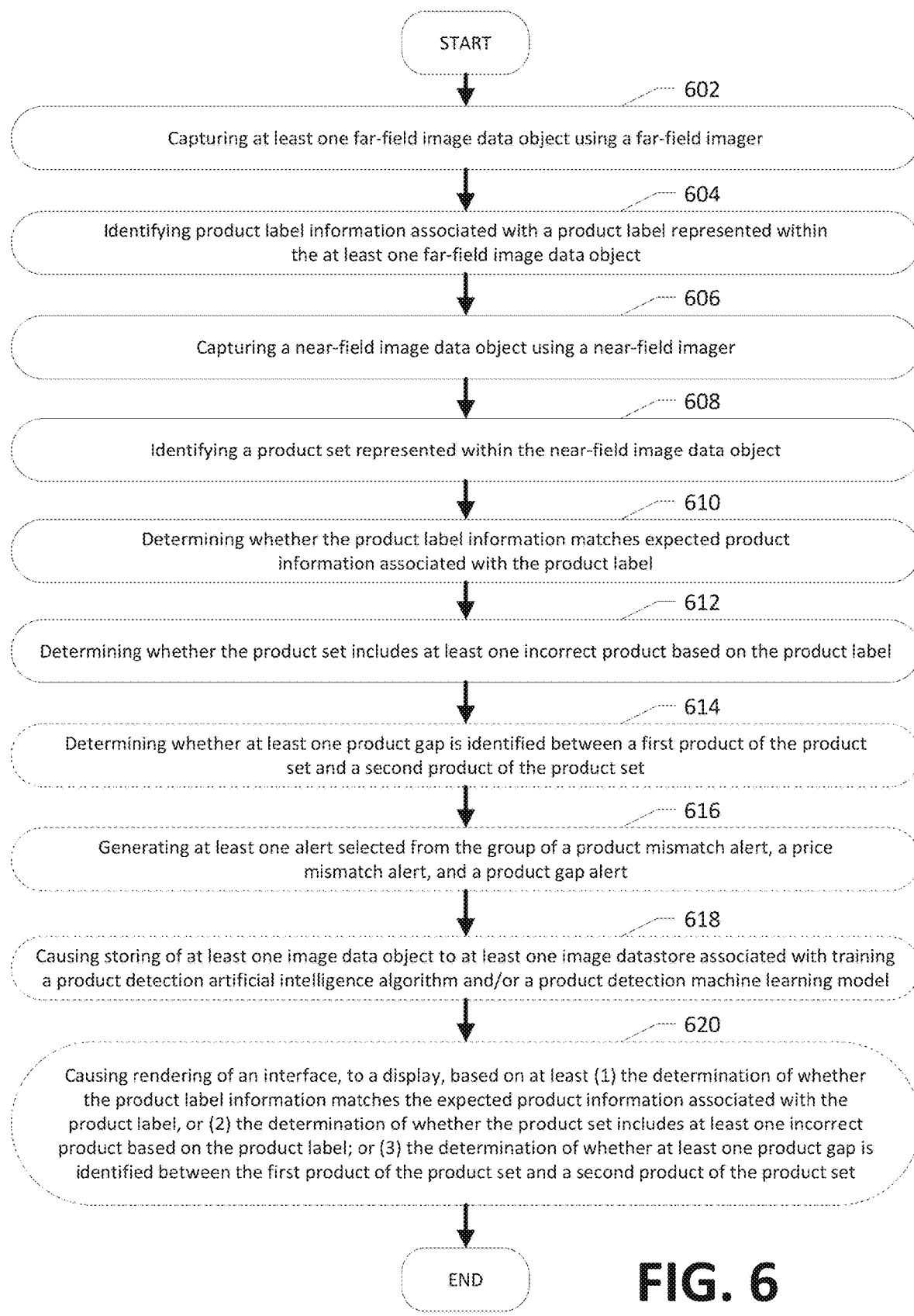
Figure 7:
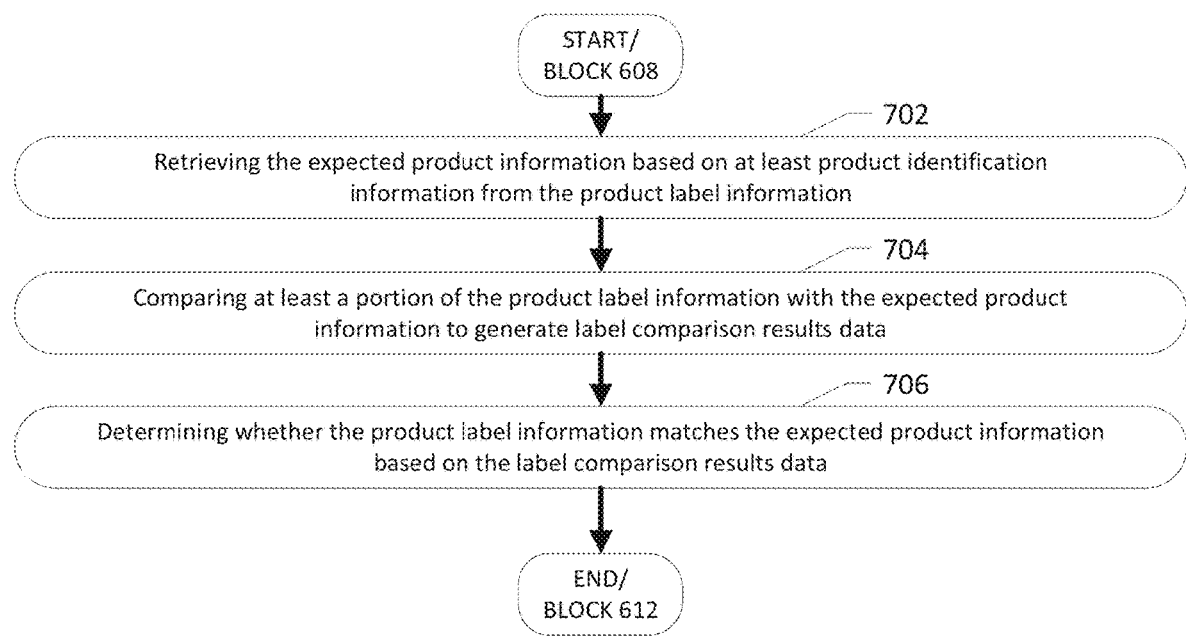
Figure 8:
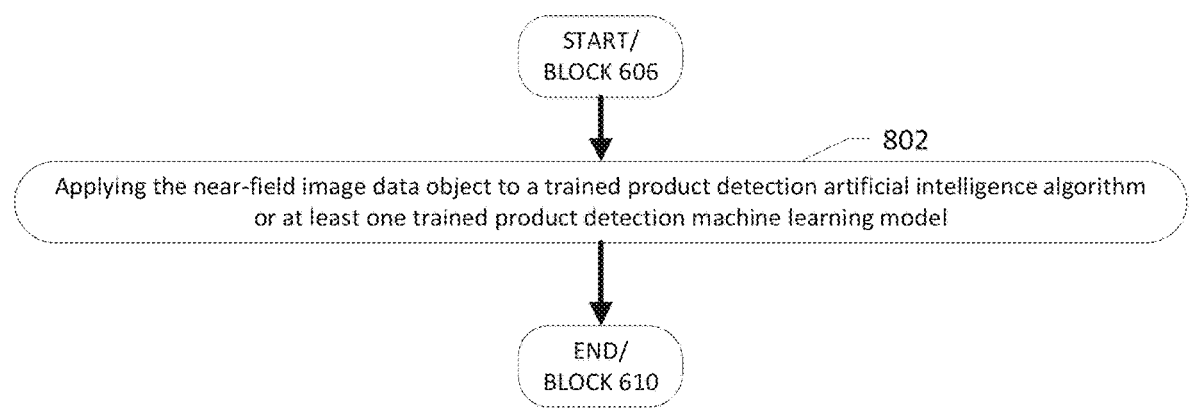
Figure 9:
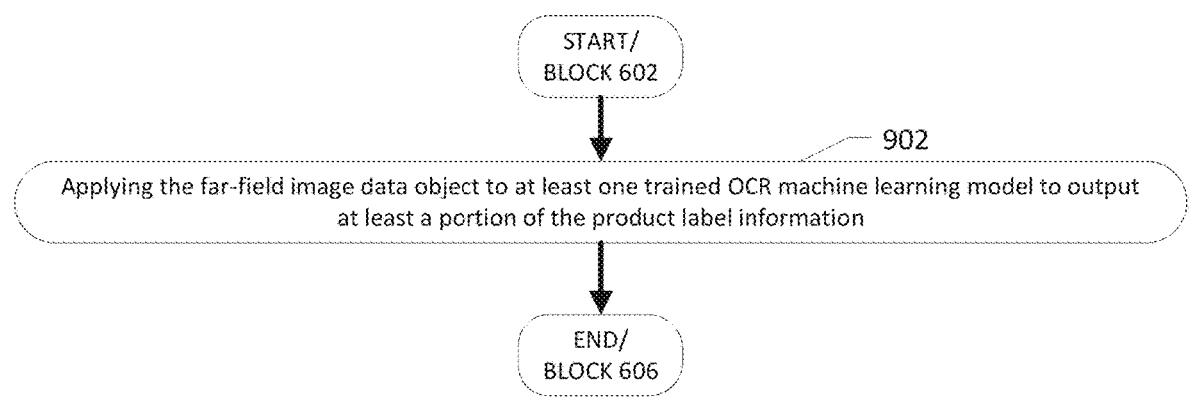
Figure 10:
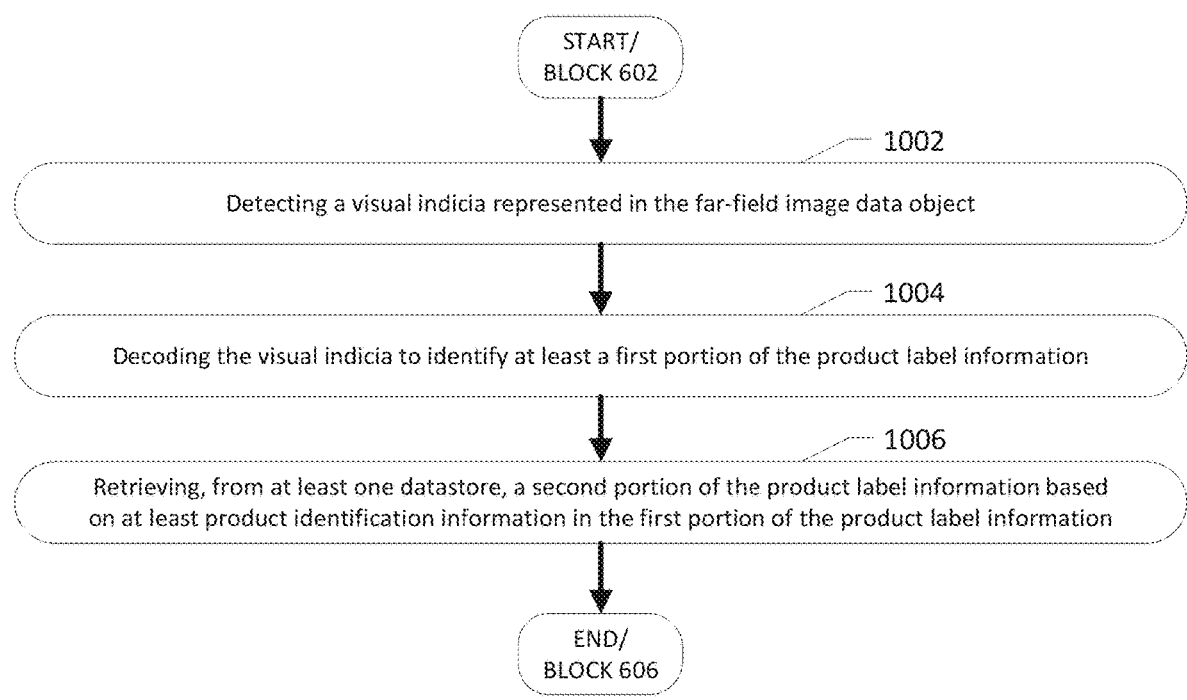
Figure 11:
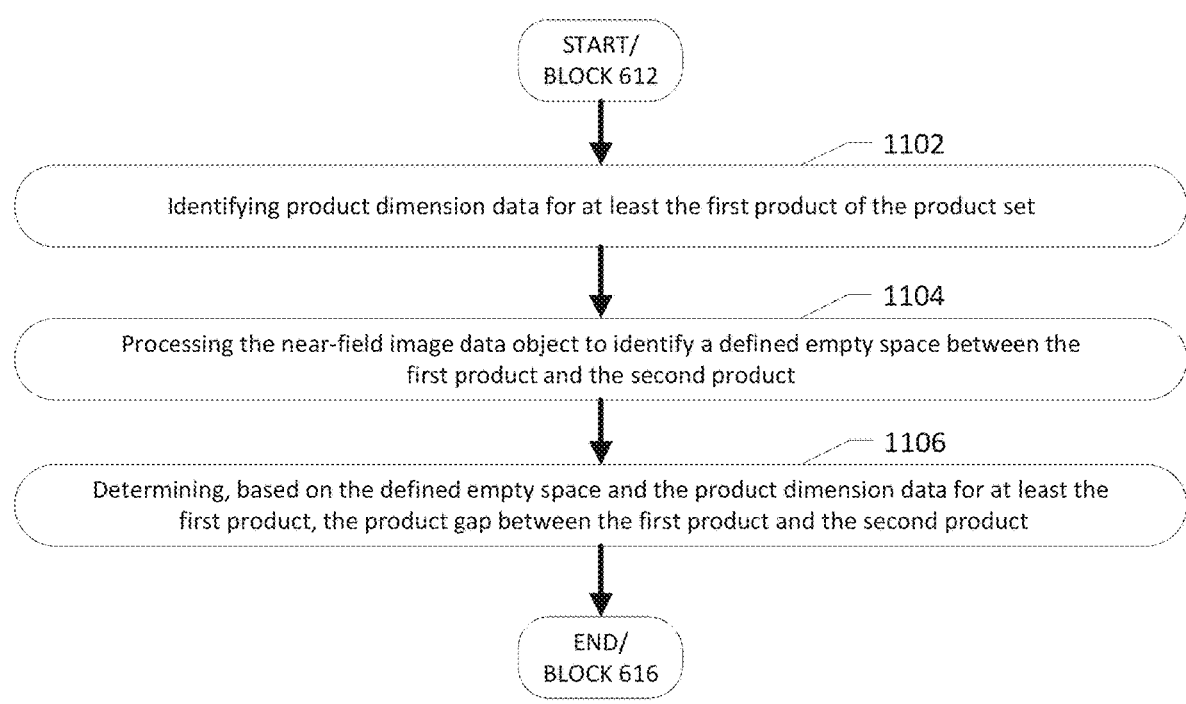

Having thus described the embodiments of the disclosure in general terms, reference now will be made to the accompanying drawings, which are not necessarily drawn to scale, and wherein:

FIG. 1 illustrates a block diagram of a first example apparatus in accordance with at least one example embodiment of the present disclosure;

FIG. 2 illustrates a block diagram of a second example apparatus in accordance with at least one example embodiment of the present disclosure;

FIG. 3 illustrates a visualization of example field of views captured by an example apparatus in accordance with at least one example embodiment of the present disclosure;

FIG. 4 illustrates an example shelving location located within a retail environment as well as corresponding image data objects captured in accordance with at least one example embodiment of the present disclosure;

FIG. 5 illustrates an example product including various product features in accordance with at least one example embodiment of the present disclosure;

FIG. 6 illustrates a flowchart including example operations for an example process for automatic product verification and shelf product gap analysis, in accordance with at least one example embodiment of the present disclosure;

FIG. 7 illustrates a flowchart including example additional operations for an example process for automatic product verification and shelf product gap analysis, specifically for determining whether the product label information matches expected product information associated with a product label, in accordance with at least one example embodiment of the present disclosure;

FIG. 8 illustrates a flowchart including example additional operations for an example process for automatic product verification and shelf product gap analysis, specifically for identifying a product set represented within a near-field image data object, in accordance with at least one example embodiment of the present disclosure;

FIG. 9 illustrates a flowchart including example additional operations for an example process for automatic product verification and shelf product gap analysis, specifically for identifying product label information associated with a product label represented within a far-field image data object, in accordance with at least one example embodiment of the present disclosure;

FIG. 10 illustrates a flowchart including example additional operations for an example process for automatic product verification and shelf product gap analysis, specifically for identifying product label information associated with a product label represented within a far-field image data object, in accordance with at least one example embodiment of the present disclosure; and FIG. 11 illustrates a flowchart including example additional operations for an example process for automatic product verification and shelf product gap analysis, specifically for identifying at least one product gap, in accordance with at least one example embodiment of the present disclosure.

DETAILED DESCRIPTION

Embodiments of the present disclosure now will be described more fully hereinafter. Indeed, embodiments of the disclosure may be embodied in many different forms and should not be construed as limited to the embodiments set

Overview

In particular environments, such as retail locations, products are often displayed via shelving throughout a given location. In some contexts, products shelved at a certain location are meant to be displayed with an associated product label. For functionality, the product label for a given product should provide accurate information regarding identifying information for the product (e.g., a product name, UPC, and/or other identifier(s)), pricing information, and/or other product information that may be relevant upon inspection (e.g., by passing prospective consumers). When products are placed in incorrect locations (e.g., placed near an incorrect product label), it is desirable that the operators (staff, owners, and/or the like) of the retail location become aware of such conditions so that the operators can remediate the error. For example, a retail location staff member may replace the incorrect product (or multiple incorrect products) with a correct one, and/or update the product label to reflect correct product information (e.g., correct product identifying information and/or pricing information. It is often difficult for a human operator to readily identify misplaced products and/or product labels at a particular location corresponding to nearby products.

Similarly, it is desirable that retail location operators become aware of certain other conditions regarding product placement on shelving throughout the retail location. For example, in circumstances where gaps are present in a products shelved together in a retail location, such gaps may simply be wasted space not utilized for displaying and/or selling products. However, optimizing shelving is not a task easily performed by a human operator. For example, human operators often have trouble accurately arranging products, and/or may have even more trouble with optimizing the shelving space for fitting products thereon. Such difficulties are exacerbated in circumstances where the products are of complex shapes, size, and/or the like, for example due to non-uniform shape and/or packaging of the product.

Various embodiments herein provide for automatic product verification and shelf product gap analysis, for example utilizing an imaging apparatus. The apparatus may include at least a multi-imager imaging engine, and/or a specially configured processor as described herein, and/or one or more non-transitory memory device(s) including computer-coded instructions for configuring the apparatus in execution with the at least one processor. In some such embodiments, the multi-imager imaging engine is in communication with the at least one processor such that the processor may control one or more aspects of the multi-imager imaging engine (e.g., activation of one or more sensors for capturing corresponding image data object(s), activation of one or more illuminator source(s) to produce corresponding illumination projection patterns, and/or the like).

In at least some example embodiments utilize a multi-imager imaging engine for capturing a plurality of image data objects that may be processed for any of a plurality of image processing tasks, for example automatic product verification and shelf product gap analysis. In some such embodiments, the plurality of image data objects may be captured simultaneously (or near-simultaneously) in response to a limited number of user interactions. For example, in this regard, a user may only perform one interaction via the multi-imager imaging engine to cause capturing of the plurality of image data object(s), for example via a plurality of imagers of the multi-imager imaging engine, and/or subsequent initiation of imaging processing task(s) associated therewith. In this regard, a plurality of image processing tasks may be initiated simultaneously and/or in series in response to the single user interaction with the multi-imager imaging engine, which may each be performed in series or in parallel.

In an example context, for example, the multi-imager imaging engine includes at least a near-field imager and a far-field imager. The near-field imager may include image capture optics, such as one or more lenses, defining a wide field of view focused at a first focal point. The far-field imager may include image capture optics, such as one or more lenses, defining a more narrowed field of view focused at a second focal point further than the first focal point. The near-field imager and far-field imager may each include an image sensor for capturing associated image data objects representing the corresponding field of views. For example, in some embodiments, the near-field imager includes a near-field image sensor configured to capture light that transverses through the near-field image capture optics, and the far-field imager includes a far-field image sensor configured to capture light that transverses through the far-field image capture optics. It should be appreciated that such image sensor(s) may each be configured to produce image data object(s), for example based on an associated resolution.

The wider field of view imager, for example the near-field imager, enables capture of an image data object representing the wider field of view with clarity at a near range. In this regard, the near-field imager may be positioned to capture a near-field image data object that may include a product label and/or environment information associated with the product label. For example, the near-field image data object may include data representing the shelving space surrounding the product label (e.g., above, below, and/or on one or more sides of the product label). Additionally or alternatively, in some embodiments, the near-field image data object includes data representing a product within the near-field of view. Accordingly, the near-field image data object may represent various information useful for understanding the shelving space available at a particular location, and/or the product(s) to be shelved at the location.

The narrower field of view imager, for example the far-field imager, enables capture of an image data object representing a narrower field of view with clarity at a further range. In this regard, the far-field imager may be positioned to capture a far-field image data object that includes a more detailed representation of the product label, and/or information thereon. The far-field imager may capture a much more detailed image data object for the narrower field of view, for example such that the far-field image data object may be processed to identify one or more details represented in the captured image data object even from a far distance (e.g. more than a 0.3 meters from the product label). In this regard, the far-field image data object may represent various information useful in identifying details of a product label and/or processing such details, including one or more visual indicia(s) rendered on the product label such as a barcode, QR code, and/or representation of another 2D symbology.

The captured image data objects may subsequently be processed for one or more of a myriad of image processing tasks, for example for automatic product verification and shelf product gap analysis. For example, such processing may take occur via one or more components of the multi-imager imaging engine, for example one or more processors embodied thereon, and/or one or more components configured for communication with the multi-imager imaging engine, such as an associated processor of one or more device(s) communicable with the multi-imager imaging engine. For example, in some embodiments, the multi-imager imaging engine is included in an imaging apparatus, such as a mobile imaging apparatus and/or fixed imaging apparatus, that further includes one or more processors and/or associated circuitry for performing one or more of the image processing tasks. In some circumstances, a first image data object is prioritized for a particular task, and the second image data object associated with a second field of view may be processed as a backup image in the instance that the first image data object cannot be processed successfully.

In at least one example embodiment, the near-field image data object is processed by one or more artificial intelligence models, and/or other machine learning algorithms, to detect a set of products at the depicted location and represented in the near-field image data object. In some embodiments, the machine learning algorithm(s) and/or artificial intelligence model(s) may be trained to detect any of a myriad of product types.

Additionally or alternatively, in at least one example embodiment, the far-field image data object is processed identify one or more product details represented via the product label. In some example contexts, such processing may include detecting and decoding one or more visual indicias rendered on the product label. For example, the far-field image data object may be processed to detect and decode a UPC barcode to identify product information embodied therein. Additionally or alternatively, in some embodiments, processing the far-field image data object includes performing optical character recognition (OCR) for one or more text elements included on the product label and represented in the far-field image data object. Embodiments may perform OCR in any of a myriad of manners, for example using one or more machine learning models trained to perform OCR.

In some such embodiments, the near-field image data object and/or far-field image data may be processed to determine whether products located at the depicted location are located appropriately with respect to the product label. In this regard, details associated with the product set identified from the near-field image data object may be compared with product details information identified from the representation of the product label in the far-field image data object. For example, the product details may be compared with the relative location details of the detected products, and/or information on each product for example by one or more barcode(s) and/or other visual indicia rendered on the product, may be used to verify the product is placed near the correct product label. For example, product details identified for the product(s) identified from the near-field image data object may be compared with product details identified for the product label from the far-field image data object, for example to determine whether the produce label includes correct information (e.g., at least product identifying information and/or product pricing information) for the associated products identified in the depicted location. By utilizing the near-field imager and the far-field imager, such functionality may be performed with improved success at varying ranges, even at higher scanning ranges where the apparatus is located further from the product label and/or products.

Additionally or alternatively, in some embodiments, the same captured image objects may be processed for one or more other image processing tasks, for example product gap analysis. In some such embodiments, the location details of the product set identified from the near-field image data object may be used to approximate a gap distance between the product(s) in the product set. One or more of the image data object(s) may be processed to identify product dimensions for one or more product types in the product set. For example, product identifying information identified from the product label represented in the far-field image data object may be used to identify product dimension(s) (e.g., a height, width, and/or length for the corresponding product). In some such embodiments, for example, the product identifying information may be used to retrieve the product dimensions for the associated product from one or more product information datastore(s). In this regard, the identified product dimensions may be utilized to generate the product gap(s) between one or more products of the product set. The product gaps may be stored for further processing and/or for providing to a user, for example via one or more display(s) of the imaging apparatus.

In some embodiments, the captured image data object(s) may additionally or alternatively be utilized any of myriad of other purposes. For example, in some embodiments, the captured image data objects may be collected and/or stored for future uses, such as training one or more product detection machine learning model(s) and/or artificial intelligence algorithm(s). In some such embodiments, the imaging apparatus may be configured to transmit one or more of the captured image data object(s) to one or more associated systems for storage. For example, in some embodiments, the imaging apparatus transmits one or more of the captured image data object(s) to a cloud system configured for storing such image data object(s) and/or training one or more associated model(s) and/or algorithms. In some embodiments, one of the image data object(s) may be stored for such uses, for example only the near-field image data object as including more data representing the environment of the depicted location, for example which may include more representations of products and/or product gaps than the corresponding far-field image data object.

An example process for automatic product verification and shelf product gap analysis may thus be performed using an imaging apparatus including a multi-imager imaging engine. For example, a user may interact with the imaging apparatus to initiate capture via the multi-imager imaging engine. In one example context, the user may engage a scan trigger of the imaging apparatus while pointing the imaging apparatus towards a shelving location, for example which may include one or more products and/or at least one product label. The imaging apparatus may, in response to the user interaction, begin capturing image data object(s) and/or processing one or more of the captured image data object(s) in attempts to successfully scan one or more visual indicia(s) represented therein for a product label. In some embodiments, the imaging apparatus utilizes a far-field imager of the multi-imager imaging engine to capture one or more far-field image data objects until one or more product details are identified from the captured far-field image data object(s). For example, in at least one example context, the imaging apparatus continues to capture far-field image data objects until a visual indicia (such as a barcode) is successfully detected and decoded from a captured far-field image data object, and product pricing details are identified from the captured far-field image data object, for example from decoding the visual indicia and/or parsing one or more other product details on the product label (e.g., pricing text included thereon).

In some embodiments, once the one or more product details are identified from one or more captured far-field image data object(s), the imaging apparatus may capture a near-field image data object using a near-field imager of the multi-imager imaging apparatus. Additionally or alternatively, in some embodiments, a scanning light (e.g., a projected scanning pattern such as a linear laser pattern) is automatically turned off upon successfully identifying the product details from the far-field image data object and/or upon successfully capturing the near-field image data object using the near-field imager. The wider field of view embodied by the near-field imager may result in the near-field image data object including additional data representing the location captured, for example representing the environment surrounding the product label (e.g., to the left, right, above, and/or below the product label). The imaging apparatus may utilize the captured near-field image data object to identify a product set represented therein. For example, the imaging apparatus may implement an artificial intelligence algorithm and/or machine learning model to identify the product set in the representation of the environment surrounding the product label. The appropriate products may be determined based on an earlier acquired location from the decoded visual indicia and/or other retail location-specific shelf configuration accessible to the imaging apparatus. Additionally or alternatively, in some embodiments, the apparatus is configured to identify one or more product features represented in the captured image data object(s), such as the near-field image data object, that may be utilized to identify a product and/or determine the type of product. In some embodiments, the artificial intelligence algorithm is trained to detect multiple products, for example based on a specific retail location owner, store location, product category, and/or the like. Alternatively or additionally, in some embodiments, a plurality of artificial intelligence algorithms and/or machine learning models are utilized for a particular retail location owner, store location, product category, and/or the like. For example, each of the artificial intelligence algorithms and/or machine learning models may be trained to identify a specific product type associated with a particular subset of products, and/or even one particular product.

In some embodiments, the imaging apparatus is configured to compare the identified product set with one or more expected product(s) based on product details identified from the product label (for example, identified based on the detected and/or decoded visual indicia. In some such embodiments, the comparison is determined based on the results of one or more trained product detection AI algorithm(s) and/or trained product detection machine learning model(s). For example, the apparatus may, via the trained AI algorithm(s) and/or machine learning model(s), identify one or more product features for an identified product, for example to determine the specific product type within the captured representation. For example, the product features may include one or more outward-facing text features, design features (e.g., images, patterns, and/or the like), shape features, and/or any combination thereof. In at least some such embodiments, the apparatus is similarly configured to perform OCR for one or more text features present on an identified product in the product set, for example to get a product name, maker, model, and/or other information based on the representation of the product body and/or packaging. It should be appreciated that in some embodiments, the apparatus is configured to rectify aspects of the product feature in the representation, for example curvatures of text features, image orientations, and/or the like, to enable successful processing and/or comparison of such features with one or more corresponding expected values. Additionally or alternatively, in some embodiments, information decoded from the visual indicia may be utilized to identify expected product(s), for example based on a pre-populated database for the retail location owner, store, and/or the like. The apparatus may compare the product set with the expected product(s), and cause rendering of one or more interfaces configured associated with the comparison. For example, the comparison may result in a determination by the apparatus of whether the product set includes a correct product (or products), or includes all and/or one or more incorrect products, based on whether a match between the identified product set and the expected products was determined. The apparatus may cause rendering of one or more interfaces including the results of the comparison, for example a "correct product(s)" interface element or an "incorrect product(s)" interface, as appropriate based on the comparison results.

Additionally or alternatively, in some embodiments, the imaging apparatus is configured to compare identified product pricing information with expected product pricing information. For example, the identified product pricing information may embody a product price identified from the representation of the product label using OCR. The expected product pricing information may be decoded from the visual indicia, and/or for example may be identified from one or more pre-determined datastore(s) for the retail location owner, store, and/or the like, based on product identification information decoded from the visual indicia. The apparatus may be configured to compare the identified product pricing information with the expected product pricing information to determine whether the values of such information matches (i.e., the label price for the product matches the expected price for the product). In some embodiments, the apparatus is configured to cause rendering of one or more interfaces configured based on the results of the comparison. For example, the apparatus may cause rendering of a "correct price" interface element or an "incorrect price" interface, as appropriate based on the comparison results. It should be appreciated that, in some embodiments, a single interface is provided including both such interface elements within.

Additionally or alternatively still, in some embodiments, the apparatus is configured to determine whether one or more product gaps is present at the shelving location depicted in the captured image data object(s). For example, in some embodiments, the apparatus is configured to identify the product dimensions for each of the identified product types in the product set. As described, the apparatus may identify the product dimensions based on product identification information decoded from a visual indicia on the product label, for example by querying one or more datastores (which may be stored locally or remote) based on the product identification information and receiving the product dimensions in response. Additionally or alternatively, the apparatus may process the near-field image data object to detect such product gaps based on the identified product dimensions, for example where arrangements of the products of a product set are determined to result in a product gap between one or more products that, in the aggregate, amount to more than the product dimensions for at least one product type to be shelved at the location (e.g., indicating that another product may be shelved at the location currently and/or if properly rearranged).

In some embodiments, the apparatus may generate one or more alerts based on various determined and/or otherwise identified data values. For example, the apparatus may generate a product mismatch alert in a circumstance where the apparatus determines at least one improper product is identified at a particular location. Additionally or alternatively, in some embodiments, the apparatus may generate a price mismatch alert in a circumstance where apparatus determines the product pricing information identified from the product label does not match expected pricing information for the product. Additionally or alternatively, in some embodiments, the apparatus may generate a product gap alert in a circumstance where the apparatus identifies sufficient product gap. One or more of the generated alerts may be utilized in causing rendering of one or more associated interfaces, as described herein. Additionally or alternatively, in some embodiments, the apparatus is configured to cause storage of the generated alert(s) to one or more datastores. For example, in some embodiments, the apparatus stores such alert(s) to a local database embodied on the apparatus. Alternatively or additionally, in some embodiments, the apparatus is configured to transmit the alerts to a cloud system configured for storing the alerts in one or more remote datastore(s). The cloud system may additionally or alternatively process the alert(s) for providing one or more notifications, and/or otherwise for causing rendering of one or more interfaces associated with the alerts (for example, to user devices associated with store location staff members).

Optionally, in at least some embodiments, the apparatus is additionally or alternatively configured to cause storage and/or further processing of one or more of the captured image data objects. For example, in some embodiments, the apparatus is configured to transmit the near-field image data object and/or far-field image data object to a cloud system. In some embodiments, the transmission to the cloud system causes the cloud system to store one more of the image data object(s), for example for use in training one or more machine learning model(s) and/or artificial intelligence model(s) at a future time. Additionally or alternatively, in some embodiments, the transmission of the near-field image data object and/or far-field image data object causes the cloud system to utilize one or more of the image data object(s) in training at least one machine learning model and/or at least one artificial intelligence algorithm.

It should be appreciated that embodiments of the present disclosure include methods, computer program products, and computer-implemented methods for performing automatic product verification and shelf product gap analysis. In this regard, some such embodiments may utilize a plurality of imagers (for example, a near-field imager and a far-field imager, or a plurality of imagers including a near-field imager, a mid-field imager, and a far-field imager, and/or the like) to improve the likelihood of successfully completing each image processing task. Additionally or alternatively, some embodiments utilize AI algorithm(s) and/or machine learning models to improve capabilities with respect to product identification and/or proper product identification based on product location (for example, relative to the location of an associated product label. In some such embodiments, for example, utilizing an imager associated with a narrow field of view improves the likelihood of successfully identifying information from a captured representation of a product label (for example, by detecting and decoding a visual indicia included therein, and/or utilizing OCR to read text data on the product label), while utilizing an imager associated with a wider field of view increases the amount of environment data that may be captured and processed for identifying product(s) and/or gaps at the depicted location, thus reducing the likelihood of requiring multiple images to fully analyze a particular shelving location within a retail location.

It should be appreciated that the process described above may be embodied in any of a myriad of manners. For example, in some embodiments, the process described above is embodied as a computer-implemented method, for example executed via generic computing hardware and/or any of the hardware configurations described herein. For example, in some embodiments, the computer-implemented method is executed via a specially configured imaging apparatus including a multi-imager imaging engine, such as a near-far imager, and/or one or more processors configured for performing the data processing operations described herein. Alternatively or additionally, embodiment apparatuses are provided, for example specially configured imaging apparatuses including a multi-imager imaging engine and/or one or more processors configured for performing the data processing operations described herein. In some embodiments, the apparatus includes one or more memory devices storing computer-coded instructions for configuring the apparatus in execution with the processor or a plurality of processors. Alternatively or additionally, embodiment computer program products are provided. For example one or more computer program products include at least one non-transitory computer-readable storage medium having computer program code stored thereon, the computer program code, in execution with at least one processor, configured for performing the processes as described herein.

Example Apparatuses of the Present Disclosure

FIG. 1 illustrates an example apparatus in accordance with at least one example embodiment of the present disclosure. Specifically, FIG. 1 illustrates an example imaging apparatus 100, and corresponding components thereof. As illustrated, the imaging apparatus 100 includes an imaging engine 102, a processor 104, an activation component 106, and a display 108. In some embodiments, the activation component 106 is optional. Additionally or alternatively, in some embodiments, the display 108 is optional.

The imaging engine 102 includes at least one imager configured for capturing image data object(s). For example, the imaging engine may include any number of imagers configured to capture any number of corresponding image data object(s). Non-limiting examples of the imaging engine 102 include a single-imager imaging engine, a dual-imager imaging engine, a triple-imager imaging engine, and/or an imaging engine including more than three imagers. In some embodiments, the imaging engine 102 includes one or more illuminator sources and/or corresponding projection optics for producing one or more illumination(s). For example, one or more illuminations may be produced to illuminate one or more field of view(s) capturable by the imaging engine. Each illumination may be particularly configured to sufficiently illuminate a particular field of view for capture by a particular corresponding imager. Additionally or alternatively, an illumination may embody or include an aimer pattern projected into the field of view(s). The aimer pattern may represent a center point of one or more field of views, and/or a particular line of sight for capture. In this regard, a user may use the aimer pattern to align the imaging apparatus 100 with an object to be scanned, for example a barcode (or other visual indicia) on a product label.

The processor 104 may be embodied in any of a myriad of manners. For example, the processor 104 may be embodied by one or more microprocessors, central processing unit(s) (CPU(s)), field programmable gate array (FPGA), application-specific integrated circuit (ASIC), and/or other processing circuitry. In this regard, the processor 104 may be specially configured to perform various functionality for automatic product verification and shelf product gap analysis, such as the operations described herein. For example, the processor 104 may be configured for receiving signals from the activation component 106, activating one or more components of the imaging engine 102, receiving one or more image data object(s) from the imaging engine 102, processing the one or more image data object(s), and/or causing rendering to the display 108. In some embodiments, the processor 104 is included in, and/or otherwise embodied within, the imaging engine 102.

The activation component 106 may be embodied by one or more devices, components, circuitry, and/or the like, configured to activate scanning functionality via the imaging engine 102. In some embodiments, the activation component 106 is embodied by an activation triggered located on or otherwise engageable via the chassis of the imaging apparatus 100. Alternatively or additionally, in some embodiments, the activation component 106 is embodied by one or more buttons located on or engageable through the chassis of apparatus 100. In some embodiments, the activation component 106 is optional, such as where activation occurs automatically in response to movement of the imaging apparatus 100, automatically in response to voice command, and/or automatically in response to one or more detected visual indicia.

The display 108 may be any of a number of devices, components, and/or the like configured to display user interface data. In some embodiments, for example, the display 108 is embodied by a LED and/or LCD display visible on the imaging apparatus 100. In some such embodiments, the display 108 is configured to receive data from the processor 104 for rendering to one or more user interface(s). Additionally or alternatively, in some embodiments, the display 108 is configured to receive user interaction (e.g., a tap, gesture, voice command, and/or the like) for interacting with the user interface and/or initiating functionality associated with a user interface. For example, in some embodiments the display 108 comprises a touch-adaptive display integrated to both provide rendered information to a user and receive input (e.g., touch input) from the user for processing.

FIG. 2 illustrates an example apparatus in accordance with at least one example embodiment of the present disclosure. Specifically, FIG. 2 illustrates an example multi-imager imaging apparatus 200, and corresponding components thereof. As illustrated, the multi-imager imaging apparatus 200 includes a multi-imager imaging engine 250, a processor 104, an activation component 106, and a display 108. Similarly named components may be embodied and/or perform identically as described above with respect to FIG. 1, and in the interest of brevity repeated disclosure is omitted.

The multi-imager imaging engine 250 includes a plurality of imagers, for example embodied at least by image capture optics and an image sensor. In at least one example context, the example multi-imager imaging engine comprises at least one of the integrated illumination-aimer apparatus(es), and/or subassemblies thereof, described in U.S. Non-provisional application Ser. No. 16/684,124 titled "INTEGRATED ILLUMINATION-AIMER IMAGING APPARATUSES," filed Nov. 14, 2019, the contents of which is incorporated herein by reference in its entirety. As illustrated, for example, the multi-imager imaging engine 250 includes a near-field imager, comprising near-field image capture optics 202A and a near-field image sensor 204A, and a far-field imager, comprising far-field image capture optics 202B. Each of the image capture optics 202A and 202B may be embodied by one or more lenses configured for defining a particular field of view together with the corresponding image sensors 204A and 204B. In this regard, the near-field image sensor 204A may receive light transmitted through the near-field image capture optics 202A and capture such light incident on the near-field image sensor 204A to output a corresponding near-field image data object. Similarly, the far-field image sensor 204B may receive light transmitted through the far-field image capture optics 202B and capture such light incident on the far-field image sensor 204B to output a corresponding far-field image data object.

As illustrated, the multi-imager imaging engine 250 further includes illuminator source(s) 206 and illuminator projection optics 208. The illuminator source(s) 206 may include any number of illuminator sources. Each illuminator source of the illuminator source(s) 206 may be embodied by a light generating component, such as a LED, laser, and/or the like. The light produced by a particular illuminator source may be directed towards a corresponding component of the illuminator projection optics 208. For example, the illuminator projection optics 208 may include one or more lenses functioning as pattern projection optics that produces a light pattern based on the incoming light produced by a corresponding illuminator source. In one example embodiment, the illuminator source(s) 206 includes at least an aimer source configured to produce light to be used in generating an aimer pattern (e.g., such as a linear laser pattern for use in aligning for barcode scanning) and/or the illuminator projection optics 208 includes aimer pattern projection optics designed to produce an aimer pattern from the incoming light.

Each imager may define a particular field of view. For example, FIG. 3 illustrates a visualization of example field of views captured by an example apparatus in accordance with at least one example embodiment of the present disclosure. In this regard, FIG. 3 includes a wide field of view 302 and a narrow field of view 304. In some embodiments, the wide field of view 302 corresponds to a near field of view capturable via a near-field imager of the multi-imager imaging apparatus 200, and/or the narrow field of view 304 corresponds to a far field of view capturable via a far-field imager of the multi-imager imaging apparatus 200. In some embodiments, the focal point of each field of view differs. For example, the focal point for the near-field imager may be closer to the multi-imager imaging apparatus 200 than that of the far-field imager, such that the focus of an object in the wide field of view 302 is better in circumstances where the object is at a closer range, and the focus of an object in the narrow field of view 304 is better in circumstances where the object is at a further range. It should be appreciated that the size of the field of view may correspond to an associated image size, for example where the wide field of view 302 is captured and represented as a near-field image data object and the narrow field of view 304 is captured and represented as a far-field image data object, the near-field image data object is of a larger resolution than the far-field image data object.

In some embodiments, the multi-imager imaging apparatus 200 is configured to function with a high likelihood of success within a wide range. For example, in at least one example context, the multi-imager imaging apparatus 200 may be configured to optimally perform processes for automatic product verification and shelf product gap analysis within a 2-10 foot range from a product label, but may be likely to succeed with sufficient accuracy above a desired threshold at a much larger range, such as from 4 centimeters to 40 feet for a 10 mil visual indicia, for example, due at least in part to the flexible usage of the multiple imagers.

Example Environments of the Present Disclosure

FIG. 4 illustrates an example shelving location located within a retail environment as well as corresponding image data objects captured in accordance with at least one example embodiment of the present disclosure. The depicted environment includes a product label 400, which includes various information rendered thereon. For example, as illustrated, the product label 400 includes a product pricing information 406, product name information 408, and visual indicia 404. Additionally, as illustrated, the environment includes a product set at the shelving location, the product set including the product 410A and product 410B. Within the depicted environment, the product 410A and 410B are separated by a product gap 412.

The depicted environment includes a top shelf and a bottom shelf, each comprising various products of a product set associated with the product label 400. It should be appreciated that the product set may include any number of products, and in some embodiments may include products of various product types. In some embodiments, the product label 400 is associated with only one product type (e.g., an expected product type), such that all products of product types other than the expected product type located at the shelving location may be identified as an incorrect product. As illustrated, for example, the depicted environment includes incorrect product 414.

One or more imaging apparatuses, such as the multi-imager imaging apparatus 200, may be used to capture representations of the depicted environment, for example for performing automatic product verification and shelf product gap analysis. In at least one example context, the multi-imager imaging apparatus 200 may be utilized to capture at least a far-field image data object and a near-field image data object for use in performing such image processing tasks. For example, image data object 452 represents a near-field image data object that may be captured and processed for various purposes, and image data object 454 represents a far-field image data object that may be captured and processed for the same and/or other purposes. For example, such image data object(s) may be utilized to identify the product gap 412 and/or incorrect product 414, as described herein.

As illustrated, the near-field image data object 452 represents a wider view of the depicted environment than the far-field image data object 454, for example due to the configured field of views associated with the near-field imager used to capture the near-field image data object 452 and the far-field imager used to capture the far-field image data object 454. In this regard, the image data object(s) 452 and 454 may be captured simultaneously, or near simultaneously (e.g., upon detecting a visual indicia) without requiring multiple user engagements with the multi-imager imaging apparatus 200. Each captured image data object may include information to be used for any of a number of purposes, and with different levels of focus. For example, the far-field image data object 454 may include data representing the visual indicia in better focus (e.g., more clear within the image data object) than the near-field image data object 452. Additionally or alternatively, the near-field image data object may include more details regarding the surrounding environment due to the nature of the wider field of view, for example better enabling processing of the products at the shelving location associated with the product label 400 and/or any product gaps that may be present at the shelving location.

In at least one example embodiment, the far-field image data object 454 is processed for purposes of scanning (e.g., detecting and decoding) a visual indicia on a product label, for example scanning the visual indicia 404. In some embodiments, the multi-imager imaging apparatus 200 is configured to produce an aimer pattern, such as a linear laser aimer pattern, for use in aligning the multi-imager imaging apparatus 200 with the product label 400, for example such that a far-field imager is aligned for capturing a far-field image data object including the product label, and/or at least a visual indicia thereof. Additionally or alternatively, the far-field image data object 454 may be processed for one or more additional purposes, for example to product label information included on the product label 400. For example, the far-field image data object 454 may be processed for identifying at least label pricing information represented on the product label 400, such that the label pricing information may be compared with expected pricing information to determine whether or not the listed price matches. In at least some embodiments, the far-field image data object 454 is processed utilizing one or more trained OCR machine learning model(s), for example to identify text information included on the product label 400. Additionally or alternatively, the far-field image data object 454 may be processed using the one or more visual indicia detection algorithms and/or one or more visual indicia decoding algorithm(s), for example to detect and decode the visual indicia on the product label 400.

In at least one example embodiment, the near-field image data object 452 is processed for purposes of performing product verification, and/or gap detection, at the shelving location. In this regard, the additional information associated with the wider field of view may better enable identification of products and/or gaps at the shelving location without requiring additional image data object(s) be captured and processed. In at least some embodiments, the near-field image data object is processed utilizing one or more trained product detection AIs and/or trained product detection machine learning models, for example to identify products represented in the near-field image data object 452. Additionally or alternatively still, in some embodiments, the near-field image data object 452 is processed utilizing one or more trained OCR machine learning model(s), for example to identify text information represented within the near-field image data object(s) that may be associated with one or more products represented in the near-field image data object 452 (such as based on text included on a product or packing of a product). Additionally or alternatively, in some embodiments, the near-field image data object 452 is processed utilizing one or more image processing algorithms to determine whether one or more product gap(s) is/are within the near-field image data object 452.

Although illustrated with only one product label, it should be appreciated that one or more image data object(s) may include multiple product labels located at one or more shelving location(s). In this regard, the multi-imager imaging apparatus 200 and/or other imaging apparatuses may be configured to segment the shelving location into sub-shelving locations (e.g., a first location associated with a first product label and a second location associated with a second product label) and subsequently process the captured image data object(s) based on the sub-shelving locations. For example, a first product of a first product type that is expected to be located at a first location may be identified as an incorrect product if located at a second location (e.g., closer to the incorrect product label for the second location), and/or similarly a second product of a second product type that is expected to be located at the second location may be identified as an incorrect product if located at the first location (e.g., closer to the other product label for the first location). In this regard, it should be appreciated that a captured image data objects may be processed based on any number of product label(s), product type(s), product location(s), and/or the like. In some embodiments, a location of the multi-imager imaging apparatus 200, for example, may be determined and compared to a known database of defined areas including one or more shelving locations and corresponding expected products for such shelving locations.

FIG. 5 illustrates an example product 500 including various product features in accordance with at least one example embodiment of the present disclosure. In this regard, each of the product features may be used in one or more processes for identifying product(s) in a captured image data object (such as a near-field image data object), performed by the multi-imager imaging apparatus 200 or another imaging apparatus. For example, a product detection AI algorithm and/or product detection AI machine learning model may be trained to learn to identify the product 500 based on some or all of the product features that distinguish the product 500 within a captured representation of a shelving location. In this regard, a trained product detection AI algorithm and/or product detection machine learning model may learn one or more of such features to be able to identify the product 500 within one or more image data object(s), such as the near-field image data object 452. In some embodiments, each trained product detection AI algorithm and/or trained product detection machine learning model is specially trained, or otherwise configured, for identifying one type of product, for example the product 500 or another product. In other embodiments, one or more trained product detection AI algorithm and/or trained product detection machine learning model is specially trained, or otherwise configured, for identifying products of multiple product types, for example the product 500 and another product having a different set of product features.

The product features include a plurality of text elements, including front texts 504A, 504B, and 504C, and non-uniform text 506 on a first side of the product 500, and non-uniform text 508 on a top side of the product 500. In some such embodiments, one or more trained OCR machine learning model(s) is utilized to identify such text elements represented within a captured image data object, such as a near-field image data object. For example, in some embodiments, at least one trained OCR machine learning model may be configured to identify text elements affected with different non-uniform effects. In some embodiments, a trained OCR machine learning model is trained to identify one or more text elements at a non-uniform angle due to the perspective of the captured image data object and/or due to the rendering of the text element on the product, such as the text element 506. Additionally or alternatively, in some embodiments, the same model and/or a different trained OCR machine learning model is trained to identify curved text elements, for example due to the perspective of the captured image data object and/or due to the rendering of the text element on the product, such as the text element 508. In some embodiments, the same model and/or a different trained OCR machine learning model is trained to identify text elements represented in a standard manner (e.g., uniformly and/or otherwise isometric from the perspective of the captured image data object), such as the text elements 504A, 504B, and/or 504C.

One or more such text elements may be identified as represented in a given captured image data object, and/or may be used for identifying a product represented within the captured image data object. For example, the text elements that are identifiable within a captured image data object may depend on the perspective of the image data object, the distance from the product 500, and/or the like. In one such example context, from a certain distance away from the product 500, smaller size text element(s) such as the text element 504C may not be identifiable while larger size text element(s) such as the text element 504A, 506, and/or 508 may remain identifiable. In this regard, any number of text elements may be used to identify the product 500 represented within a captured image data object, and the identifiable text elements at various ranges may enable the product 500 to remain identifiable (based on at least one or more of the text elements, for example) at various ranges. In some such contexts, not all text element(s) may be required for identifying the product 500, for example such that in a context where at least one of the front text elements 504A, 504B, and/or 504C is identifiable the product 500 may be identified. Text information identified within a captured image data object may be directly compared with expected product feature(s), such as expected text information, for use in identifying the product within the captured data object. Additionally or alternatively, text information may be utilized as inputs associated with identification via one or more product detection AI algorithm(s) and/or product detection machine learning model(s).

In some embodiments, one or more text elements may additionally be used for any of a myriad of other product verification processes. For example, in some embodiments, an identified text element may be determined by an imaging apparatus, such as the multi-imager imaging apparatus 200, to represent an expiration date. In this regard, expiration date may be used to determine whether the identified product has expired. Further in this regard, the multi-imager imaging apparatus 200, for example, may be configured to compare the expiration date from the identified text element with a current date, and generate expiration comparison data based on the determination. In a circumstance where such expiration comparison data indicates the product has expired (e.g., a current datetime exceeds the expiration date) one or more expiration alert(s) may be generated. In some such embodiments, the expiration alerts may be provided to the user in any of a myriad of ways, for example through rendering to an interface via an associated display, one or more audio alerts, and/or the like. For example, in at least one example embodiment, "Product Expired" warning text may be rendered to one or more interface(s) provided via a display associated with the multi-imager imaging apparatus 200.

Similarly, other non-text product features may similarly be learned for use in identifying the product 500. In some embodiments, the shape, dimension data, dimension ratios, and/or other physical properties of the product 500 may be utilized to identify representations of the product 500 within a captured image data object, such as a near-field image data object. Alternatively or additionally, one or more non-text elements included on the product 500 may be used in identifying the product 500. For example as illustrated, the product 500 includes a product image 502. In some such embodiments, one or more product detection AI algorithm(s) and/or product detection AI machine learning algorithm(s) may learn to identify representations of the product image 502 for use in identifying the product 500. Alternatively or additionally, an imaging apparatus 200 may perform one or more additional image processing algorithms to identify the product image 502, for example to compare identified product image(s) with expected product image(s) and/or the like. In some embodiments, a product image may be detected and decoded, for example where a barcode or other visual indicia represented on the product is utilized to identify the product.

In this regard, it should be appreciated that any physical characteristics and/or elements that may be visible within a captured image data object may be learned as product features for use in identifying products of the particular product type. In this regard, for other products, the same characteristics and/or additional characteristics may be learned for identifying products of the other product type.

Example Processes of the Disclosure

FIGS. 6-11 each illustrate a flowchart including example operations for an example process, and/or associated sub-processes for automatic product verification and shelf product gap analysis. The flowcharts each depict a process (e.g., a method) that may be implemented in any of a myriad of manners. In some embodiments, the process is implemented as a computer-implemented process via any of the means described herein. For example, in at least one example context, one or more of the process(es) is performed by one or more specially configured apparatuses described herein, such as the multi-imager imaging apparatus 200 and/or imaging apparatus 100. In some such embodiments, an imaging apparatus includes a specially configured processor (e.g., configured via computer-coded instructions stored on one or more non-transitory memory devices associated therewith) to perform such operations. For purposes of illustration, the operations are described with respect to performance by the multi-imager imaging apparatus 200, but should not be construed as limited to such implementations. Indeed, any of a number of apparatuses and/or computer program products may be specially configured to perform the processes as depicted and described.

FIG. 6 illustrates a flowchart including example operations for an example process for automatic product verification and shelf product gap analysis, in accordance with at least one example embodiment of the present disclosure. The process may be performed by an imaging apparatus, such as the multi-imager imaging apparatus 200 as depicted and described herein.

The process begins at block 602. At block 602, the multi-imager imaging apparatus 200 includes means, such as the processor 104, multi-imager imaging engine 250, activation component 106, and/or display 108, for capturing at least one far-field image data object using a far-field imager. In some embodiments, the processor 104 is configured to activate a far-field imager of the multi-imager imaging engine 250 to capture one or more far-field image data object(s), such as to capture far-field image data object(s) until a visual indicia is detected. In some embodiments, the multi-imager imaging apparatus 200 is configured to capture the at least one far-field image data object in response to one or more signals received from the activation component 106, for example in response to user interaction (e.g., pressing the button or pulling a scanning trigger). In other embodiments, the multi-imager imaging apparatus 200 is configured to begin capturing the at least one far-field image data object in response to automatic activation (e.g., raising the multi-imager imaging apparatus 200 to a scanning position, automatic detection of a visual indicia, and/or the like).

At block 604, the multi-imager imaging apparatus 200 includes means, such as the processor 104, multi-imager imaging engine 250, activation component 106, and/or display 108, for identifying product label information associated with a product label represented within the at least one far-field image data object. The product label information may include various text information included on the product label and represented in the far-field image data object. For example, in some embodiments, the product label information may include product pricing information, product name information, and/or the like. Alternatively or additionally, in some embodiments, the product label information only includes product pricing information included on the product label, where the product pricing information represents a price for which the product associated with the product label is being offered at a retail location. In some embodiments, the product label information is identified using one or more OCR machine learning model(s), for example as described herein.

At block 606, the multi-imager imaging apparatus 200 includes means, such as the processor 104, multi-imager imaging engine 250, activation component 106, and/or display 108, for capturing a near-field image data object using a near-field imager. In some embodiments, the processor 104 is configured to activate a near-field imager of the multi-imager imaging engine 250 to capture the near-field image data object. In some embodiments, the near-field image data object is captured in response to successfully detecting and/or decoding a visual indicia, for example to identify the product label information.

At block 608, the multi-imager imaging apparatus 200 includes means, such as the processor 104, multi-imager imaging engine 250, activation component 106, and/or display 108, for identifying a product set represented within utilize a trained product detection AI and/or trained product detection machine learning model. In this regard, the multi-imager imaging apparatus 200 may, via the trained product detection AI and/or trained product detection model, detect products in the near-field image data object based on various features represented in the near-field image data object based on learned features representing objects for which the AI and/or model were trained. In some embodiments, one or more models and/or AIs are utilized to identify different product types. Additionally or alternatively, in some embodiments, the multi-imager imaging apparatus 200 is configured to utilize one or more trained OCR machine learning model(s) in identifying the product set. For example, in at least some embodiments, the multi-imager imaging apparatus 200 may utilize the trained OCR machine learning model(s) to identify text represented in the near-field image data object. The identified text may be compared to expected product features (e.g., text features on a product or product packaging) for use in identifying a product (or multiple products) represented in the near-field image data object.

At block 610, the multi-imager imaging apparatus 200 includes means, such as the processor 104, multi-imager imaging engine 250, activation component 106, and/or display 108, for determining whether the product label information matches expected product information associated with the product label. In some such embodiments, the expected product information is identified by detecting and/or decoding a visual indicia represented in the far-field image data object. Alternatively or additionally, the expected product information may be retrieved from one or more datastores, for example based on a first portion of expected product information identified from a visual indicia. For example the multi-imager imaging apparatus 200 may compare the product label information and the expected product information, to make such a determination. In some embodiments, the multi-imager imaging apparatus 200 may determine any portion of the product label information that does not match a corresponding portion of the expected product information.

At block 612, the multi-imager imaging apparatus 200 includes means, such as the processor 104, multi-imager imaging engine 250, activation component 106, and/or display 108, for determining whether the product set includes at least one incorrect product based on the product label. In some embodiments, for example, the multi-imager imaging apparatus 200 may be configured to determine, from the expected product information, an expected type of product (e.g., an expected product type) associated with the product label. In this regard, the expected product type may include one or more identifiers and/or other data values that represents a particular product type. The multi-imager imaging apparatus 200 may compare the product type associated with each product in the product set to the expected product type to determine whether one or more products mismatches the expected product type. In some embodiments, the multi-imager imaging apparatus 200 may store comparison data for each product in the product set that indicates whether the product type for the product matches the expected product type.

In some embodiments, alternatively or additionally, in some embodiments, the multi-imager imaging apparatus 200 is configured to determine whether the product label is correctly positioned. For example, the multi-imager imaging apparatus 200 may determine its current location. Using the current location, the expected product label associated with that current location may be identified to determine whether the identified product label matches the expected product label, for example based on a comparison of the information from the identified product label with the information of the expected product label. In some embodiments, the multi-imager imaging apparatus 200 directly accesses, or transmits one or more requests to access, a planogram associated with a particular environment (e.g., a retail environment) to determine the expected product label and/or corresponding product label information for a particular location, such as the current location. It should be appreciated that the current location may identify a particular coordinate in the retail environment, and/or may include one or more vertical coordinate(s), shelf identifier(s), and/or the like indicating a particular shelf, location, and/or the like within a retail environment.

At optional block 614, the multi-imager imaging apparatus 200 includes means, such as the processor 104, multi-imager imaging engine 250, activation component 106, and/or display 108, for determining whether at least one product gap is identified between a first product of the product set and a second product of the product set. In some embodiments, one or more product gap(s) is/are identified based on multiple products of the product set, for example based on gaps on multiple sides of a product and/or multiple gaps between a plurality of products. Additionally or alternatively, in some embodiments, a product gap may be identified without any products (e.g., a product gap representing an entirely empty space) and/or identified utilizing only one product (e.g., a product gap representing empty space between a product and the end of a shelving location, for example). In at least one example context, for example, a product gap is identified in a circumstance where a defined empty space is identified within the near-field image data object, where the defined empty space is determined to be of a size that satisfies (e.g., exceeds) a gap threshold. In some embodiments, the gap threshold is configurable by one or more user(s), based on one or more identified product(s) of the product set, and/or predetermined. For example, in some embodiments the gap threshold is embodied by a predetermined size, such that a defined empty space and/or combination of defined empty space(s) that are determined to exceed the predetermined size are identified as one or more product gap(s). In another example context, the gap threshold is embodied by a determined size based on the product(s) of the product set. For example, the gap threshold may be determined based on a percentage of the product dimension data associated with the one or more product(s) (e.g., 100% of a product dimension such as a product width, 50% of a product dimension such as a product width, 25% of a product dimension such as a product width, and/or the like). In some embodiments, the multi-imager imaging apparatus 200 is configured to enable the gap threshold to be configured based on user interaction. In some embodiments, the multi-imager imaging apparatus 200 is configured to store data embodying and/or otherwise representing each identified product gap within the near-field image data object, for example for use in visually distinguishing the identified product gap(s) within the near-field image data object.

Additionally or alternatively, in some embodiments, the multi-imager imaging apparatus 200 is configured to identify a location of a product gap within a particular environment (e.g., a retail location). In some embodiments, the multi-imager imaging apparatus 200 associates a determined product gap with location data (e.g., GPS location data, triangulated location data, and/or the like) identified via locations circuitry of the multi-imager imaging apparatus 200 embodied in hardware, software, firmware, and/or a combination thereof. In some embodiments, the shelving location associated with the determined product gap is identified (e.g., based on one or more product labels identified within image data object(s) utilized to identify the product gap) and processed and/or stored as the location of the product gap.

Additionally or alternatively still, in some embodiments, the multi-imager imaging apparatus 200 is configured to trigger one or more actions in response to detecting the product gap. For example, in some embodiments, the multi-imager imaging apparatus 200 is configured to initiate transmission of one or more specially configured transmissions to notify one or more user(s) (e.g., operators of a retail environment) of the existence of the gap. In some embodiments, the multi-imager imaging apparatus 200 is configured to cause rendering of one or more interface(s) indicating existence of the identified product gap, as described herein. Alternatively or additionally still, in some embodiments, the multi-imager imaging apparatus 200 automatically triggers one or more processes for remediating the product gap, for example by activating and/or controlling one or more robotic devices and/or associated control devices to cause a movement of one or more products, and/or to place a new product at the location of the product gap, to fill or reduce the product gap. It should be appreciated that any of a number of custom-implemented process (es) may be initiated in response to detecting the product gap, including algorithmic and/or computing process(es) for processing and display of information, and/or machine-implemented process(es) resulting in physical movement of one or more product(s).

At optional block 616, the multi-imager imaging apparatus 200 includes means, such as the processor 104, multi-imager imaging engine 250, activation component 106, and/or display 108, for generating at least one alert selected from the group of a product mismatch alert, a price mismatch alert, and a product gap alert. The generated alert(s) may be based on the one or more earlier performed determinations. For example, in some embodiments, the multi-imager imaging apparatus 200 generates a product mismatch alert based on the determination of whether at least one incorrect product is included in the product set (e.g., in a circumstance where one or more product(s) are identified that are of a product type that does not match an expected product type). Additionally or alternatively, in some embodiments, the multi-imager imaging apparatus 200 generates a price mismatch alert based on the determination of whether at least a portion of the product label information matches expected product information associated with the product label (e.g., in a circumstance where product pricing information does not match expected product pricing information of the expected product information). Additionally or alternatively, in some embodiments, the multi-imager imaging apparatus 200 generates a product gap alert based on the determination of whether at least one product gap is identified (e.g., between at least a first product of the product set and a second product of the product set). In some embodiments, the one or more alert(s) are rendered via one or more user interfaces, as described herein. Such alerts may be provided via one or more user interfaces, sound alerts, and/or the like. For example, in some embodiments, the multi-imager imaging apparatus 200 is configured to provide one or more of the alerts as text alert(s) via a user interface rendered via a display associated with the multi-imager imaging apparatus 200. The sound alert may be output by a speaker of the multi-imager imaging apparatus 200.

In some embodiments, only a sound alert (e.g., an audio alert) is output or only a visual alert (e.g., rendered information) is output, and in other embodiments both a sound alert and a visual alert are output. The sound alert may comprise a particular audio tone (e.g., a particular frequency or progression of frequencies) indicating a particular identified product gap. In some embodiments, the sound alert comprises particular audio information, such as audio information embodying a stored audio file (e.g., speech indicating a gap has been identified). The particular sound alert may differ based on the determination. For example, the sound alert embodying or associated with a product mismatch alert may differ from the sound alert embodying or associated with a product gap alert, and/or the like. In some other embodiments, one or more sound alerts may be the same, and/or other information (e.g., a corresponding visual alert) may differ.

At optional block 618, the multi-imager imaging apparatus 200 includes means, such as the processor 104, multi-imager imaging engine 250, activation component 106, and/or display 108, for causing storage of at least one image data object to at least one image datastore associated with training a product detection artificial intelligence algorithm and/or a product detection machine learning model. In at least one context, the multi-imager imaging apparatus 200 is configured to transmit the near-field image data object and/or the far-field image data object to a cloud server for storage. In this regard, the cloud server may be include and/or otherwise be in communication with one or more image datastore(s) configured for storing image data objects. Additionally or alternatively, the cloud server may be configured for, or in communication with one or more associated systems configured for, training one or more AI algorithm(s) and/or machine learning model(s) based on the stored image data objects. For example, in some embodiments, at least one product detection AI, product detection machine learning model, OCR machine learning model, and/or the like may be trained based on the stored image data object(s). In some embodiments, specific models and/or AIs may be trained based on different image data objects stored to the image datastore(s). For example a product detection AI algorithm and/or product detection machine learning model may be trained based on near-field image data object(s) stored to the one or more image datastore(s). Additionally or alternatively, one or more OCR machine learning model(s) for identifying text of a product label may be trained based on far-field image data object(s) stored to the one or more image datastore(s).

At optional block 620, the multi-imager imaging apparatus 200 includes means, such as the processor 104, multi-imager imaging engine 250, activation component 106, and/or display 108, for causing rendering of an interface, to a display, based on at least (1) the determination of whether the product label information matches the expected product information associated with the product label, or (2) the determination of whether the product set includes at least one incorrect product based on the product label; or (3) the determination of whether at least one product gap is identified between the first product of the product set and a second product of the product set. In some embodiments, for example, the interface includes a rendering of some or all of the captured image data object(s), or at least the near-field image data object, and/or one or more visual enhancements generated by the multi-imager imaging apparatus 200. For example, in some embodiments, one or more visual aids (e.g., bounding boxes and/or other borders) are rendered on top of the near-field image data object to visually indicate detected product(s) and/or product gap(s). Additionally or alternatively, in some embodiments, one or more other identified aspects of the image data object may also be visually indicated, for example text element(s), visual indicia(s), and/or the like. In some embodiments, for example, incorrect products are visually distinguished from other, correct products in the product set, such as by causing rendering of a different color box around products indicated as incorrect from those indicated as correct (e.g., a first color for correct products and a second color for incorrect products). Alternatively or additionally, in some embodiments, different border types may be used to distinguish correct product(s) from incorrect product(s) (if any). Additionally or alternatively, product gap(s) may similarly be identified using one or more differently colored boxes from that of correct products and/or incorrect products, and/or otherwise visually distinguished using any alternative visual aids (e.g., a different border, a different shape outline, a different design or visual effect, and/or the like).

FIG. 7 illustrates a flowchart including example additional operations for an example process for automatic product verification and shelf product gap analysis, specifically for determining whether the product label information matches expected product information associated with a product label, in accordance with at least one example embodiment of the present disclosure. The process may be performed by an imaging apparatus, such as the multi-imager imaging apparatus 200 as depicted and described herein.

The process begins at block 702, which may occur after one or more operations as described with respect to FIG. 6 and/or another process described herein, as illustrated for example. For example, in some embodiments, the process begins after block 608 of the process as depicted and described with respect to FIG. 6. In this regard, the process may replace, supplement, and/or otherwise support one or more blocks, such as the block 610 as depicted. Upon completion of the process, flow may continue to one or more blocks of the process depicted and described with respect to FIG. 6, for example to block 612 as illustrated.

At block 702, the multi-imager imaging apparatus 200 includes means, such as the processor 104, multi-imager imaging engine 250, activation component 106, and/or display 108, for retrieving the expected product information based on at least product identification information from the product label information. In some embodiments, for example, the product identification information comprises a product identifier for the associated product. In this regard, the multi-imager imaging apparatus 200 queries one or more product datastore(s) using the product identification information. The product datastore(s) may be preconfigured to include product information for any number of product types, for example stored such that the stored product information represents expected product information for products of the product type identified by the product identification information. In this regard, the product datastore(s) may be configured such that the expected product information for a particular product type is retrievable using the product identification information corresponding to the product type. In some embodiments, the product datastore(s) are maintained locally by the multi-imager imaging apparatus 200, and/or otherwise may be stored remotely (e.g., by one or more associated cloud server(s)) accessible to the multi-imager imaging apparatus 200 via one or more networks.

At block 704, the multi-imager imaging apparatus 200 includes means, such as the processor 104, multi-imager imaging engine 250, activation component 106, and/or display 108, for comparing at least a portion of the product label information with the expected product information to generate label comparison results data. For example, the product label information may include one or more data values that correspond to one or more data values of the expected product information. In at least one example context, label pricing information included is compared with expected pricing information from the expected product information. In this regard, the multi-imager imaging apparatus 200 may be configured to determine whether the pricing information identified from the product label (e.g., as represented in the product label information) matches expected pricing information (e.g., as represented in the expected product information). In some embodiments, the multi-imager imaging apparatus 200 is configured to generate the label comparison results data using at least one text comparison algorithm, and/or other data comparison algorithm(s). It should be appreciated that, in a circumstance where the portion of the product label information is determined to match a corresponding portion of the expected product information, the label comparison results data may represent a data value indicating the two portions of information match. Similarly, in a circumstance where the portion of product label information is determined not to match a corresponding portion of the expected product information, the label comparison results data may represent a second data value indicating the two portions of the information do not match.

At block 706, the multi-imager imaging apparatus 200 includes means, such as the processor 104, multi-imager imaging engine 250, activation component 106, and/or display 108, for determining whether the product label information matches the expected product information based on the label comparison results data. For example, in this regard, the multi-imager imaging apparatus 200 may be configured to read the data value represented by the label comparison results data to perform the determination, and initiate one or more appropriate operations based on the data value. For example, in some embodiments, the multi-imager imaging apparatus 200 generates one or more alert(s) based on whether the label comparison results data indicates a match in pricing information and/or one or more other data types. Alternatively or additionally, the label comparison results data may be used in rendering one or more user interfaces, for example for rendering text interface element(s) based on the value of the label comparison results data.

FIG. 8 illustrates a flowchart including example additional operations for an example process for automatic product verification and shelf product gap analysis, specifically for identifying a product set represented within a near-field image data object, in accordance with at least one example embodiment of the present disclosure. The process may be performed by an imaging apparatus, such as the multi-imager imaging apparatus 200 as depicted and described herein.

The process begins at block 802, which may occur after one or more operations as described with respect to FIG. 6 and/or another process described herein. For example, in some embodiments, the process begins after block 606 of the process as depicted and described with respect to FIG. 6. In this regard, the process may replace, supplement, and/or otherwise support one or more blocks, such as the block 608 as depicted. Upon completion of the process, flow may continue to one or more blocks of the process depicted and described with respect to FIG. 6, for example to block 610 as illustrated.

At block 802, the multi-imager imaging apparatus 200 includes means, such as the processor 104, multi-imager imaging engine 250, activation component 106, and/or display 108, for applying the near-field image data object to a trained product detection artificial intelligence algorithm or at least one trained product detection machine learning model. The trained product detection AI and/or trained product detection machine learning model may identify each product based on one or more product features represented in the near-field image data object. In this regard, the trained product detection AI and/or trained product detection machine learning model may learn such product features during training, for example to minimize the error in identifying products of various product types. In some embodiments, a plurality of trained product detection AIs, plurality of trained product detection machine learning models, and/or a plurality of a combination of trained product detection AI(s) and trained product detection machine learning model(s). For example, in this regard, each trained product detection AI and/or trained product detection machine learning model may be trained to identify a different product type, or a specific set of product types.

FIG. 9 illustrates a flowchart including example additional operations for an example process for automatic product verification and shelf product gap analysis, specifically for identifying product label information associated with a product label represented within a far-field image data object, in accordance with at least one example embodiment of the present disclosure. The process may be performed by an imaging apparatus, such as the multi-imager imaging apparatus 200 as depicted and described herein.

The process begins at block 902, which may occur after one or more operations as described with respect to FIG. 6 and/or another process described herein. For example, in some embodiments, the process begins after block 602 of the process as depicted and described with respect to FIG. 6. In this regard, the process may replace, supplement, and/or otherwise support one or more blocks, such as the block 604 as depicted. Upon completion of the process, flow may continue to one or more blocks of the process depicted and described with respect to FIG. 6, for example to block 606 as illustrated.

At block 902, the multi-imager imaging apparatus 200 includes means, such as the processor 104, multi-imager imaging engine 250, activation component 106, and/or display 108, for applying the far-field image data object to at least one trained OCR machine learning model to output at least a portion of the product label information. The trained OCR machine learning model may output identified text and/or compare such text with expected values, as described herein. In this regard, the trained OCR machine learning model may identify any of a number of text elements represented in the far-field image data object, such as text elements rendered on the product label and represented in the far-field image data object. In some embodiments, the trained OCR machine learning model is trained to identify one or more non-uniform text element(s), including curved and/or non-linear text, text represented in the data image object at an angle, and/or the like. In some embodiments, the multi-imager imaging apparatus 200 is configured to utilize a plurality of trained OCR machine learning models to output one or more portion(s) of the product label information, for example where each trained OCR machine learning model is configured to identify and/or output types of non-uniform text represented in the far-field image data object, for example. Additionally or alternatively, in some embodiments, the trained OCR machine learning model(s) may be used to process the near-field image data object (e.g. to identify text within).

FIG. 10 illustrates a flowchart including example additional operations for an example process for automatic product verification and shelf product gap analysis, specifically for identifying product label information associated with a product label represented within a far-field image data object, in accordance with at least one example embodiment of the present disclosure. The process may be performed by an imaging apparatus, such as the multi-imager imaging apparatus 200 as depicted and described herein.

The process begins at block 1002, which may occur after one or more operations as described with respect to FIG. 6 and/or another process described herein. For example, in some embodiments, the process begins after block 602 of the process as depicted and described with respect to FIG. 6. In this regard, the process may replace, supplement, and/or otherwise support one or more blocks, such as the block 604 as depicted. Upon completion of the process, flow may continue to one or more blocks of the process depicted and described with respect to FIG. 6, for example to block 606 as illustrated.

At block 1002, the multi-imager imaging apparatus 200 includes means, such as the processor 104, multi-imager imaging engine 250, activation component 106, and/or display 108, for detecting a visual indicia represented in the far-field image data object. For example, the far-field image data object may be processed to detect a barcode, QR code, or other 2D symbology rendered on the product label and represented in the far-field image data object. In some embodiments, for example, the multi-imager imaging apparatus 200 is configured to detect the visual indicia utilizing any known visual indicia detection algorithm(s). In some embodiments, the multi-imager imaging apparatus 200 is preconfigured to utilize one or more predetermined visual indicia detection algorithm(s), and/or determines the visual indicia detection algorithm to utilize based on data identified in the far-field image data object, for example.

At block 1004, the multi-imager imaging apparatus 200 includes means, such as the processor 104, multi-imager imaging engine 250, activation component 106, and/or display 108, for decoding the visual indicia to identify at least a first portion of the product label information. In some embodiments, the product label information may be encoded by the visual indicia, and decoded from the detected visual indicia utilizing any of a myriad of known decoding algorithms. Additionally or alternatively, in some embodiments, the product label information includes one or more data values, such as product identification information, for use in retrieving at least one additional portion of the product label information, as described herein.

At block 1006, the multi-imager imaging apparatus 200 includes means, such as the processor 104, multi-imager imaging engine 250, activation component 106, and/or display 108, for retrieving, from at least one datastore, a second portion of the product label information based on at least product identification information in the first portion of the product label information. For example, a product identifier and/or name may be used to query for the second portion of information. Non-limiting examples of data values of the second portion of the product label information retrieved includes product pricing information, product name information, product feature(s) for the product type, and/or product dimension data.

FIG. 11 illustrates a flowchart including example additional operations for an example process for automatic product verification and shelf product gap analysis, specifically for identifying at least one product gap, in accordance with at least one example embodiment of the present disclosure. The process may be performed by an imaging apparatus, such as the multi-imager imaging apparatus 200 as depicted and described herein.

The process begins at block 1102, which may occur after one or more operations as described with respect to FIG. 6 and/or another process described herein. For example, in some embodiments, the process begins after block 612 of the process as depicted and described with respect to FIG. 6. In this regard, the process may replace, supplement, and/or otherwise support one or more blocks, such as the block 614 as depicted. Upon completion of the process, flow may continue to one or more blocks of the process depicted and described with respect to FIG. 6, for example to block 616 as illustrated.

At block 1102, the multi-imager imaging apparatus 200 includes means, such as the processor 104, multi-imager imaging engine 250, activation component 106, and/or display 108, for identifying product dimension data for at least the first product of the product set. The product dimension data may be used to generate an image scale for representations in the near-field image data object. For example, the ratio of product length to pixel(s) may be used to generate a representative scale, such as a pixel-to-size scale (a "pixel scale") for processing the near-field image data object, and/or similarly for a far-field image data object. For example, in an example context where the product dimension data indicates that the first product is 1 foot in width, and the product is represented as 20 pixels in the near-field image data object, the pixel scale embodies data indicating that 20 pixels equates to 1 foot. In this regard, the pixel scale may be used to determine the real-world size corresponding to any number of pixels, for example where such pixels define a particular object and/or defined empty space.

At block 1104, the multi-imager imaging apparatus 200 includes means, such as the processor 104, multi-imager imaging engine 250, activation component 106, and/or display 108, for processing the near-field image data object to identify a defined empty space between the first product and the second product. In some embodiments, the multi-imager imaging apparatus 200 is configured to perform one or more known imaging processing algorithms to identify the defined empty space. A non-limiting example of such an image processing algorithm includes determining a first location where the first product ends in the near-field image data object and determining a second location where the second product begins in the near-field image data object, such that the defined empty space is embodied by a number of pixels between such determined locations. In some such embodiments, the pixel scale may be used to determine the real-world size of the defined empty space based on the determined number of pixels. For example, continuing the example where the pixel scale is defined as 1 foot equaling 20 pixels, in a circumstance where the defined empty space is embodied in the near-field image data object by 40 pixels, the defined empty space may be determined to be 2 feet in size based on the pixel scale.

At block 1106, the multi-imager imaging apparatus 200 includes means, such as the processor 104, multi-imager imaging engine 250, activation component 106, and/or display 108, for determining, based on the defined empty space and the product dimension data for at least the first product, the product gap between the first product and the second product. In at least one example context, the multi-imager imaging apparatus 200 utilizes a pixel scale determined based on the product dimension data and the near-field image data object. For example, the multi-imager imaging apparatus 200 may identify the number of pixels representing the defined empty space in the near-field image data object, and determine the size of the product gap based on the identified pixel scale. In some embodiments, the multi-imager imaging apparatus 200 is configured to identify a defined empty space as a product gap in a circumstance where the size of the product gap satisfies a predetermined and/or configurable size threshold (e.g., a numerical distance or a percentage of the product width for the first product and/or second product). Determined product gap(s) may be visually distinguished in one or more user interfaces, for example a user interface rendered to a display of the multi-imager imaging apparatus 200, via one or more specially configured boxes to that outlines the defined empty space, or a plurality of defined spaces (for example, a box of a predefined color that represents a product gap).

CONCLUSION

Although example processing apparatuses have been described above, having specific subcomponents and/or other hardware configurations, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors, alone and/or in conjunction with one or more other components described herein (for example one or more imaging engine(s)), executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer (including handheld computing devices embodied as apparatuses of the present disclosure) having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be described in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus for automatic product verification and shelf product gap analysis, the apparatus comprising:
    a multi-imager imaging engine comprising at least a near-field imager and a far-field imager, the near-field imager associated with a near field of view that is wider than a far field of view associated with the far-field imager;
    at least one processor; and
    at least one non-transitory memory having computer-coded instructions stored thereon, wherein the computer-coded instructions, in execution with the at least one processor, configures the apparatus to:
    capture at least one far-field image data object using the far-field imager;
    identify product label information associated with a product label represented within the at least one far-field image data object, wherein the product label in the far-field image data object comprises one or more visual indicia;
    detect the one or more visual indicia in the far-field image data object;
    decode the one or more visual indicia to identify at least a portion of the product label information;
    in response to successfully decoding the one or more visual indicia in the far-field image data object, capture a near-field image data object using the near-field imager;
    identify a product set represented within the near-field image data object;
    determine whether the product label information matches expected product label information associated with the product label; and
    determine whether the product set includes at least one incorrect product based on the expected product label information associated with the product label related to the decoded one or more visual indicia.

2. The apparatus of claim 1, wherein to identify the product set represented within the near-field image data object, the apparatus is configured to:
    apply the near-field image data object to a trained product detection artificial intelligence algorithm or at least one trained product detection machine learning model.

3. The apparatus of claim 1, wherein to identify the product label information associated with the product label, the apparatus is configured to:
    apply the far-field image data object to at least one trained OCR machine learning model, wherein the trained OCR machine learning model is configured to output at least a portion of the product label information.

4. The apparatus of claim 1, the apparatus further configured to:
    generate at least one alert selected from the group of a product mismatch alert, a price mismatch alert, and a product gap alert.

5. The apparatus of claim 1, the apparatus further configured to:
    cause storing of at least one image data object to at least one image datastore associated with training a product detection artificial intelligence algorithm or a trained product detection machine learning model.

6. The apparatus of claim 1, the apparatus further configured to:
    cause rendering of an interface to a display associated with the apparatus based on at least (1) the determination of whether the product label information matches the expected product label information associated with the product label, or (2) the determination of whether the product set includes at least one incorrect product based on the product label.

7. The apparatus of claim 1, wherein to determine whether the product label information matches the expected product label information associated with the product label, the apparatus is configured to:
  retrieve the expected product label information based on at least product identification information from the product label information;
  compare at least a portion of the product label information with the expected product label information to generate label comparison results data; and
  determine whether the product label information matches the expected product label information based on the label comparison results data.

8. The apparatus of claim 1, wherein the portion of the product label information comprises a first portion of the product label information, the apparatus further configured to:
  retrieve, from at least one datastore, a second portion of the product label information based on at least product identification information in the first portion of the product label information.

9. The apparatus of claim 1, the apparatus further configured to:
  identify at least one product gap between a first product of the product set and a second product of the product set.

10. The apparatus of claim 9, wherein to identify at least one product gap between the first product of the product set and the second product of the product set, the apparatus is configured to:
  identify product dimension data for at least the first product of the product set;
  process the near-field image data object to identify a defined empty space between the first product and the second product; and
  determine, based on the defined empty space and the product dimension data for at least the first product, the product gap between the first product and the second product.

11. A computer-implemented method for automatic product verification and shelf product gap analysis, the computer-implemented method comprising:
  capturing at least one far-field image data object using a far-field imager of a multi-imager imaging engine;
  identifying product label information associated with a product label represented within the at least one far-field image data object, wherein the product label in the far-field image data object comprises one or more visual indicia;
  detecting the one or more visual indicia in the far-field image data object;
  decoding the one or more visual indicia to identify at least a portion of the product label information;
  in response to successfully decoding the one or more visual indicia in the far-field image data object, capturing a near-field image data object using a near-field imager of a multi-imager imaging engine;
  identifying a product set represented within the near-field image data object;
  determining whether the product label information matches expected product label information associated with the product label; and
  determining whether the product set includes at least one incorrect product based on the expected product label information associated with the product label related to the decoded one or more visual indicia.

12. The computer-implemented method of claim 11, wherein identifying the product set represented within the near-field image data object comprises:
  applying the near-field image data object to a trained product detection artificial intelligence algorithm or at least one trained product detection machine learning model.

13. The computer-implemented method of claim 11, wherein identifying the product label information associated with the product label comprises:
  applying the far-field image data object to at least one trained OCR machine learning model, wherein the trained OCR machine learning model is configured to output at least a portion of the product label information.

14. The computer-implemented method of claim 11, the computer-implemented method further comprising:
  causing rendering of an interface to a display based on at least (1) the determination of whether the product label information matches the expected product label information associated with the product label, or (2) the determination of whether the product set includes at least one incorrect product based on the product label.

15. The computer-implemented method of claim 11, wherein determining whether the product label information matches the expected product label information associated with the product label comprises:
  retrieving the expected product label information based on at least product identification information from the product label information;
  comparing at least a portion of the product label information with the expected product label information to generate label comparison results data; and
  determining whether the product label information matches the expected product label information based on the label comparison results data.

16. The computer-implemented method of claim 11, wherein the portion of the product label information comprises a first portion of the product label information, the computer-implemented method further comprising:
  retrieving, from at least one datastore, a second portion of the product label information based on at least product identification information in the first portion of the product label information.

17. The computer-implemented method of claim 11, the computer-implemented method further comprising:
  identifying at least one product gap between a first product of the product set and a second product of the product set.

18. The computer-implemented method of claim 17, wherein identifying at least one product gap between the first product of the product set and the second product of the product set comprises:
  identifying product dimension data for at least the first product of the product set;
  processing the near-field image data object to identify a defined empty space between the first product and the second product; and
  determining, based on the defined empty space and the product dimension data for at least the first product, the product gap between the first product and the second product.

* * * * *